US012229832B2

(12) United States Patent
Wachell et al.

(10) Patent No.: US 12,229,832 B2
(45) Date of Patent: Feb. 18, 2025

(54) WEALTH MANAGEMENT SYSTEMS

(71) Applicant: Responsive Capital Management Inc., Vancouver (CA)

(72) Inventors: Davyde Wachell, Vancouver (CA); Chris Sanford, West Vancouver (CA); Logan Grosenick, New York, NY (US)

(73) Assignee: Responsive Capital Management Inc., Vancouver (CA)

( * ) Notice: Subject to any disclaimer, the term of this patent is extended or adjusted under 35 U.S.C. 154(b) by 731 days.

(21) Appl. No.: 17/297,262

(22) PCT Filed: Nov. 26, 2019

(86) PCT No.: PCT/CA2019/051694
§ 371 (c)(1),
(2) Date: May 26, 2021

(87) PCT Pub. No.: WO2020/107111
PCT Pub. Date: Jun. 4, 2020

(65) Prior Publication Data
US 2022/0028001 A1    Jan. 27, 2022

Related U.S. Application Data

(60) Provisional application No. 62/841,458, filed on May 1, 2019, provisional application No. 62/771,356, filed on Nov. 26, 2018.

(51) Int. Cl.
*G06Q 40/06* (2012.01)
*G06N 5/025* (2023.01)
*G06Q 40/03* (2023.01)

(52) U.S. Cl.
CPC .............. *G06Q 40/06* (2013.01); *G06N 5/025* (2013.01); *G06Q 40/03* (2023.01)

(58) Field of Classification Search
CPC .............................. G06Q 40/06; G06Q 40/03
See application file for complete search history.

(56) References Cited

U.S. PATENT DOCUMENTS 7,707,091 B1 * 4/2010 Kauffman .............. G06Q 30/02
705/36 R
7,818,233 B1 * 10/2010 Sloan ..................... G06Q 20/10
705/37

(Continued)

FOREIGN PATENT DOCUMENTS

CA         2312726 A1    6/1999
CA         2388898 A1    5/2001

(Continued)

OTHER PUBLICATIONS

European Patent Office, Extended European Search Report dated Jul. 1, 2022 for Application No. 19888887.7.

(Continued)

*Primary Examiner* — Azam A Ansari
(74) *Attorney, Agent, or Firm* — Norton Rose Fulbright Canada LLP; Maya Medeiros

(57) ABSTRACT

The present disclosure provides systems that help wealth management business teams improve performance in client understanding, client advising and client servicing. Systems according to some embodiments achieve this by assisting both operational and intellectual tasks of agents within the wealth management team, and also by enabling the collaborative and learning capacities of the enterprise team ensemble.

19 Claims, 27 Drawing Sheets

(56) References Cited

U.S. PATENT DOCUMENTS

| | | | | |
|---|---|---|---|---|
| 10,991,046 B1* | 4/2021 | Hocaoglu | ............... | G06Q 40/06 |
| 2007/0244777 A1* | 10/2007 | Torre | .................... | G06Q 40/00 |
| | | | | 705/35 |
| 2011/0270779 A1* | 11/2011 | Showalter | ............. | G06Q 40/02 |
| | | | | 705/36 R |
| 2011/0270780 A1* | 11/2011 | Davies | ................... | G06Q 40/06 |
| | | | | 705/36 R |
| 2014/0344185 A1* | 11/2014 | Murguia | ............... | G06Q 40/06 |
| | | | | 705/36 R |
| 2015/0088783 A1* | 3/2015 | Mun | ..................... | G06Q 40/02 |
| | | | | 705/36 R |

FOREIGN PATENT DOCUMENTS

| | | | |
|---|---|---|---|
| CA | 2834971 | A1 | 9/2012 |
| CA | 2939926 | A1 | 9/2014 |
| GB | 2367153 | A | 3/2002 |

OTHER PUBLICATIONS

International Search Report and Written Opinion, International Application No. PCT/CA2019/051694, dated Feb. 27, 2020.

* cited by examiner

Client Opportunities and Risks

| CLIENT | NET WORTH | MESSAGE | TREND | MONEY AT LARGE | | Actions | |
|---|---|---|---|---|---|---|---|
| Webster Brown | $542,344.00 | Life Change | | -$53,340.00 | | ADMIN – Carolina Christmas, a month ago | Fixed |
| Philip Hammond | $446,775.00 | Allocation vs Risk Profile | | -$9,300.00 | $24,937,886.36 Net Worth > | | |
| Ruddeger St. James | $430,044.00 | New Cash | | $60,000.00 | | ROLLOVER – Carolina Hayne, 23 days ago | |
| Ivan Illyich | $546,000.00 | Allocation vs Risk Profile | | -$13,500.00 | $65,772,404.64 Net Worth > | | |
| Murad Cantor | $900,000.00 | Life Change | | $39,900.00 | | ROLLOVER – Alice Smith, 4 days ago | |
| Xiang Astle | $250,000.00 | Excess Savings | | $11,200.00 | $17,162,354.04 Net Worth > | | |
| Harry Potters | $421,004.00 | New Cash | | $62,120.00 | | PM CONVERSATION – Dwigna Jones, 22 days ago | Onboarding |
| Anna Karenina | $1,145,342.00 | Allocation vs Risk Profile | | -$20,000.00 | $43,379,899.17 Net Worth > | | |
| Francis Underwood | $800,000.00 | Life Change | | $44,200.00 | | PM CONVERSATION – Grant Christmas | |
| James Cheng | $290,000.00 | Life Change | | -$5,000.00 | $84,656,884.79 Net Worth > | | |

FIG. 5C

| Upward Data Flow | Description | System |
|---|---|---|
| Raw Data | Raw data from fragmented, differently formatted sources | Hermes |
| Normalized Data | Aggregation and collation into normalized formats for Investment and Banking transactions | Hermes + Argonaut |
| Persona Data Model | Labeling, Categorization and smoothing into Accounting (Cash Flow and Balance Sheet) and Semantic (food, shelter, fun etc) categories for visualization and research purposes | Argonaut |
| DR + Composite Features | Dimensionality Reduction to extract features, automatic or hand construction of composite features. Curation of feature lists for event detection and predictive modelling | Symbiosis NUIT - Feature Curation |
| Event Detection + Prediction | Creation of statistical event detectors ("Mr. Smith spent more than $500 on lollipops this week"), and probabilistic predictive models ("Mrs. Smith is likely to pull cash out of her savings account in the next 90 days") | Symbiosis NUIT - Events |
| Pipeline + Evidence | Creation of human readable Next Best Actions based on events. Can specify the messaging, and accompanying "Evidence data" That appears in the advisor priority dashboard. | Symbios NUIT - Pipelines |
| Next Best Action + Response | The dashboard where the advisor receives a prioritized list of Next Best Actions. The Advisor can respond with Actions like "Not Relevant", "Snooze", "Auto-schedule Client Call" etc. | Hybrid HELIOS - Priority Dashboard |

| Downward Flow Data Flow | Description | System |
|---|---|---|
| Next Best Action Response | The advisor provides feedback Actions on whether a Next Best Action was helpful, semi-helpful or not relevant. | Hybrid HELIOS - Priority Dashboard |
| Feedback + Error For Event | The feedback is stored as "positive, semi-positive, neutral or negative error" against pipelines rules. | Symbiosis NUIT - Pipeline |
| Hand-Tuned or Auto-Tuned Event Detector Attenuation | The Researcher can view the distribution of feedback on a given event detector. They can choose to hand tune based on the feedback, or accept a system "auto-tuning" of the pipeline detector rules. | Symbiosis NUIT - Events + Attenuation |

FIG. 7

WEALTH MANAGEMENT SYSTEMS

CROSS-REFERENCE TO RELATED APPLICATIONS

This application claims the benefit of U.S. Provisional Application No. 62/771,356 filed on Nov. 26, 2018, and U.S. Provisional Application No. 62/841,458 filed May 1, 2019. Each above-referenced application is hereby incorporated herein by reference in its entirety.

FIELD

The present disclosure relates to computer systems and user interface tools that can provide decision support for wealth management.

BACKGROUND

People often make sub-optimal decisions regarding spending, saving and asset allocation when trying to achieve their short, medium and long term financial goals. Because human lives are complex and path dependent, wealth managers and advisors struggle to provide personalized and strategies adaptive to clients changing needs, preferences and life circumstances at scale. Relevant data can be in disparate data storage devices. Raw data might not provide actionable insights. A large volume of data can be difficult to process efficiently.

SUMMARY

Systems and methods described herein may be configured to identify non-linear risk from markets, client behaviour, operator error and enterprise data to provide to stakeholders, whether they be clients, advisors, supervisors, researchers or executives, clear and salient intelligence for decision-making regarding spending, saving and asset allocation when trying to achieve short, medium and long term financial goals.

According to an aspect, there is provided a system for transmitting alert notifications to devices for decision-making support, along with computer programs with instructions for configuring processors to trigger notification alerts and to implement machine learning from feedback data to tune notification thresholds to improve relevancy of future notification alert messages. An interface dashboard can display the notification alert messages and receive the feedback data for tuning and machine learning. This can reduce false positives, for example, which can waste computing resources involved in message handling and generation. The system can reduce the amount of data displayed on an interface dashboard and highlights data based on predictive relevancy and decision support for plans and objectives.

According to an aspect, there is provided a computer system for developing a wealth policy for a user, such as ongoing capital allocation and cash-flow management policy and tactics, the system comprising: a processor; a memory in communication with the processor, the memory storing instruction that, when executed by the processor cause the processor to: receive a financial state of a user, including balance sheet, cash flow, and life and personality information like age, family situation, employment, etc.; receive a financial goal of the user; determine a plan to achieve the financial goal; and determine a discount variable of the user's ability to adhere to the plan; and determine a "next best action" for a user and/or a wealth advisor, wherein the discount variable is determined by: modelling past behaviour of the user and/or others based at least in part on identifying transaction actions of the user, and identifying periodicity of the transaction actions, and segmenting each of the transaction actions to an archetype and the user to a persona; generating an output, such as visualizations, alerts for the wealth policy.

In some embodiments, identifying transaction actions of the users, includes automated event detection, feature enrichment and predictive labeling.

According to another aspect, there is provided a process for transmitting alert notifications for decision making support comprising: a model structure and state space (identified using, for example, on-line system identification and incorporating new information using, for example, reinforcement learning), the state space defined in terms of variables measuring, for example, population goals and user behaviour, the model being a parameterized, normalized, and rational client-centric model; configuration of the model structure and constraints on the model parameters being adjustable using advisor-side interface tools and/or automation via AI to define event rules (conditional on client personas and archetypes, ex-post empirical events, a priori predictions, etc.); detecting an event using the event rules and streaming population data; computing next best action data based on the event and model state, the data having evidence supporting the event; dispatching the next best action; receiving feedback data for the next best action, the feedback-data-linked operational context; updating the event rules and the next best action data based on the feedback data; Other features will become apparent from the drawings in conjunction with the following description.

According to another aspect, there is provided a system for transmitting alert notifications to devices for decision-making support, comprising a memory storing a model structure and state space, the state space defined by variables measuring population goals and user behaviour, the model being a parameterized, normalized, and rational client-centric model; a processor coupled to the memory programmed with executable instructions, the instructions configuring the processor with: event rules conditional on client profile data and prediction data generated using the model structure; an event detector to detect an event using the event rules and streaming population data; an alert engine to compute next best action data based on the event and model state, the next best action data having evidence supporting the event; and a device having the interface application for displaying the next best action data and collecting feedback data for the next best action data, the feedback data linked to an operational context; wherein the processor updates the event rules and next best action data based on the feedback data.

In some embodiments, the processor uses the state space to generate the prediction data using the model structure to infer client stage of life, a behavioral profile, client financial strategy for the stage of life and the behavioral profile, tactile adjustments to the behavioral profile or financial profile to support the client financial strategy, and a notification message for a client interface indicating at least a portion of the tactile adjustments.

In some embodiments, the processor generates the client profile data and the prediction data using categorized, normalized, enriched or enhanced features extracted from the streaming population data.

In some embodiments, the streaming population data comprises financial transaction data, balance sheet data, credit data, mortgage data, investment data, stage of life data, responses to questionnaires, demographic data, or goal data.

In some embodiments, the feedback data comprises data indicating the relevance or utility of the next best action data.

In some embodiments, the feedback data comprises data indicating activation of a detail view of the next best action data, contact of client on the next best action data, operations on client account or portfolio based on the next best action data, fund transfers, service requests.

In some embodiments, the processor adjusts event rules based on feedback data to adjust a hyperplane separating events from non-events.

In some embodiments, an event rule comprises a threshold function on one or more data features in the state space.

In some embodiments, an event rule comprises a confidence threshold on a predicted future event in the model structure.

In some embodiments, an event rule comprises a confidence threshold on a hidden or unobserved variable.

In some embodiments, the processor configures the alert engine to compute the next best action data using a hyperplane threshold on the state space to detect a set of state features.

In some embodiments, the processor configures the alert engine to compute the next best action data using a supervised learning system to predict if a past state of the state space is indicative of a future event based on indicator variables.

In some embodiments, the processor updates the event rules and next best action data based on the feedback data by adjusting a confidence threshold or hyperplane separation threshold to minimize error and maximize relevance or utility of the next best action data.

In some embodiments, the next best action data is predictive and the feedback data is indicative of a relevance variable for the next best action data.

In some embodiments, the processor updates the event rules and next best action data based on the feedback data by adjusting a priority or rank of the next best action data in terms of advisor relevance, wherein the feedback data is indicative of the advisor relevance.

In some embodiments, the interface tools configure feature selection using a list of candidate features for the model structure and selection of hyperparameters of the model structure.

In some embodiments, the event detector is a hyperplane based event detector, wherein the interface tools configure the event detector using a list of features and a hyperplane separator.

In some embodiments, the interface tools configure an event predictor using a list of features, a dependent event indicator feature, a window size, forward period prediction length, and a supervised learning method.

In some embodiments, the interface tools configure a hidden state or label predictor using a list of features, a dependent event indicator feature, a window size, and a categorization method.

In some embodiments, the interface tools display a list of model structures for selection and the model structure is a selected model structure from the list of model structures.

In some embodiments, the interface tools display model performance data for the model structures along with learning parameters and model metrics.

In some embodiments, the interface tools select a clustering process on a list of features and configure a hyperplane detector to generate a signal for a event that a user has moved from a behavioral cluster to another behavioral cluster.

In some embodiments, the feedback data is used to adjust a rank or priority of the next best action data.

In some embodiments, the processor configures a next best action pipeline for an event label, the pipeline configures the event label to use and supporting data, an advisor message, broadcast scope for the next best action, and a process for the next best action.

In some embodiments, the ontology indicates states that are fully observable, partially observable, hidden, or expired that are useful for determining the next best action data.

In some embodiments, the ontology indicates a financial persona for selecting the next best action data and wherein the processor tunes relevance of the next best action to the ontology.

In some embodiments, the binary univariate thresholding function for features determines a level of saliency or significance in triggering the event detection and the next best action data.

In some embodiments, the on-line system data represents states of a client life situation and financial situation.

In some embodiments, the streaming population data represents just in time data that impacts beliefs in an ontology for the selection of the next best action data.

In some embodiments, the feedback data rates the relevance of the next best action data for display at the interface dashboard or a threshold for a hyperplane which separates an event and a non-event.

According to another aspect, there is provided herein a process for alert notifications at an interface dashboard for decision making support comprising storing, at memory, a model structure and state space using on-line system data and additional machine output data generated using reinforcement learning, the state space defined in terms of variables measuring population goals and user behaviour, the model being a parameterized, normalized, and rational client-centric model; detecting, an event from streaming population data using a processor configured with event rules conditional on client profile data and prediction data; computing, at the processor, next best action data based on the event and model state, the next best action data having evidence supporting the event; dispatching an alert with the next best action data to a device having an interface application, the alert indicating the evidence; automatically displaying the next best action data using the interface dashboard; receiving, at the interface application, feedback data for the next best action data, the feedback data linked to an operational context; updating the event rules and the next best action data based on the feedback data using the processor; and automatically updating the display of the interface dashboard based on the updated event rules.

BRIEF DESCRIPTION OF DRAWINGS

The following figures set forth embodiments in which like reference numerals denote like parts. Embodiments are illustrated by way of example and not by way of limitation in the accompanying figures.

In the figures which illustrate example embodiments:

FIGS. 5A-5D show example screenshots from an enterprise application presented to a portfolio manager user according to one embodiment.

FIG. 7 illustrates a flow of data through model learning to advisor judgment according to one embodiment.

DETAILED DESCRIPTION

Figure 1:
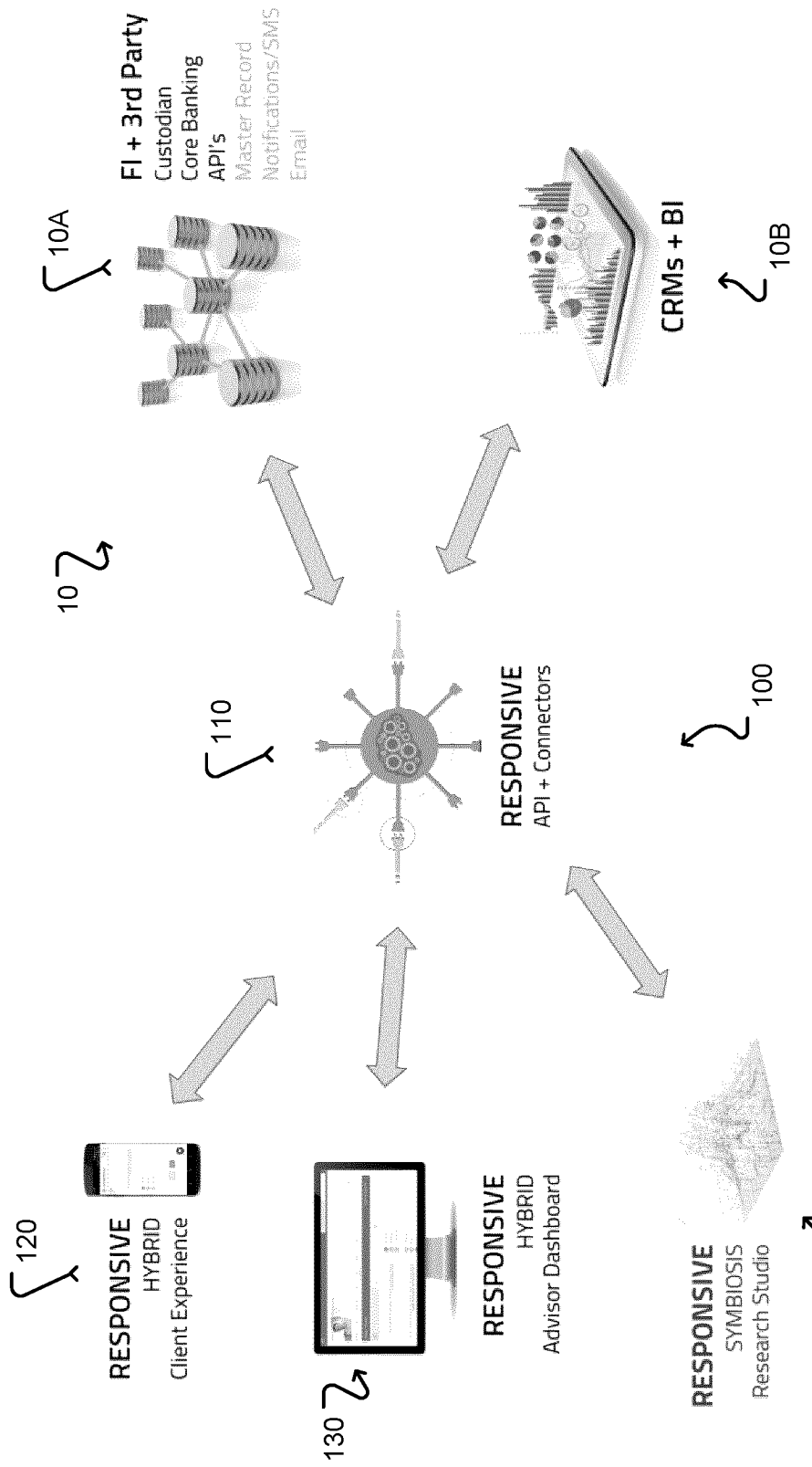
FIG. 1 schematically illustrates elements of an example wealth management system according to one embodiment.

The following describes systems and methods that may help wealth management business teams improve performance in client understanding, client advising and client servicing. According to some embodiments this may be achieved by assisting both operational and intellectual tasks of agents within the wealth management team, and also by enabling the collaborative and learning capacities of the enterprise team ensemble. The wealth management team may comprise a plurality of wealth advisors. Wealth advisor herein refers to a frontline advisor dealing directly with a client.

An advisor typically services a plurality of clients and does not have the ability to track details of each client's life individually. Even if an advisor is able to track the details of a client's life, the advisor may not understand the predictive significance of such details nor understand the importance an event may have on one client vs. another. Data available to advisors is limited and fragmented. For example, advisors generally do not have access to specifics of clients spending habits, and even if they do, these specifics are available from disparate sources which may be accessed manually. The data so obtained may be processed manually or in an ad-hoc manner. Additionally, advisors deal with each client individually and can only rely on personal interactions with the client to understand the client's background and appetite for risk. Additionally, advisors generally cannot detect or predict important aspects or changes in a client's life which may affect their wealth management preferences, risk appetite, or financial goals. Generally, services availed by clients are fragmented and not available for analysis to the wealth management team or the advisor. In some embodiments, systems and methods disclosed herein may facilitate a unification of fragmentary data and services. In particular, in some embodiments, systems and methods disclosed herein may facilitate an advisor taking a holistic approach, which otherwise would not be possible. The systems and methods herein may allow an advisor to obtain predictions or detections of a plurality of factors related to a client's state, not just bank or wealth information, which otherwise would not be possible. In some embodiments, the systems and method disclosed herein enable a hybrid machine-enabled advisor.

Performance may be measured or evaluated by both the efficiency and quality of granular work performed by front-line workers, and also the ongoing design of customer service segmentation and policy from branch managers, executives and researchers.

Conveniently, systems and methods described herein may help users such as clients grow and maintain wealth.

Some embodiments provide a vertically integrated "system of intelligence", which may be defined as a highly focused analytical system intended to solve business challenges and objectives, for wealth management. In an example embodiment, systems and methods described herein include software that aids day to day service activities, advisor judgement, enterprise policy design and "responsiveness" to changing client life situations, and also enables research on the client population base, within a framework of segmenting behavioral personas and detecting events that drive decision making and strategy in wealth advice.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 shows an example wealth management system 100 according to one embodiment of the present disclosure. The system 100 comprises an interface layer 110 that receives financial and other data from a variety of data sources 10 and facilitates data transfer and communications among one or more client applications 120 for investor clients, one or more enterprise applications 130 (accessed on end user devices) for advisors and other financial professionals, and a research studio 140 (accessed on end user devices) for researchers and executives. In some embodiments, the system 100 is designed for composability, modularity and extensibility for preserving best-in-breed legacy technologies, and enabling easy adoption of future technologies. Some embodiments provide an evolvable framework for building a wealth management "system of intelligence" by providing a light grand framework, with an opinionated insights pipeline that focuses on fortifying the transmission of client intelligence to the advisor, and the enterprise research team. In some embodiments client service policies and strategies are optimized according to ongoing empirical findings from the relationship between client data and advisor actions. This may be referred to as "optimizing wealth management" or "Q*" in abbreviated form, herein. System 100 may be designed to cooperate with customer relationship management (CRM) software or business intelligence (BI) software 10B. Such software 10B may be 3$^{rd}$-party software.

Figure 2:
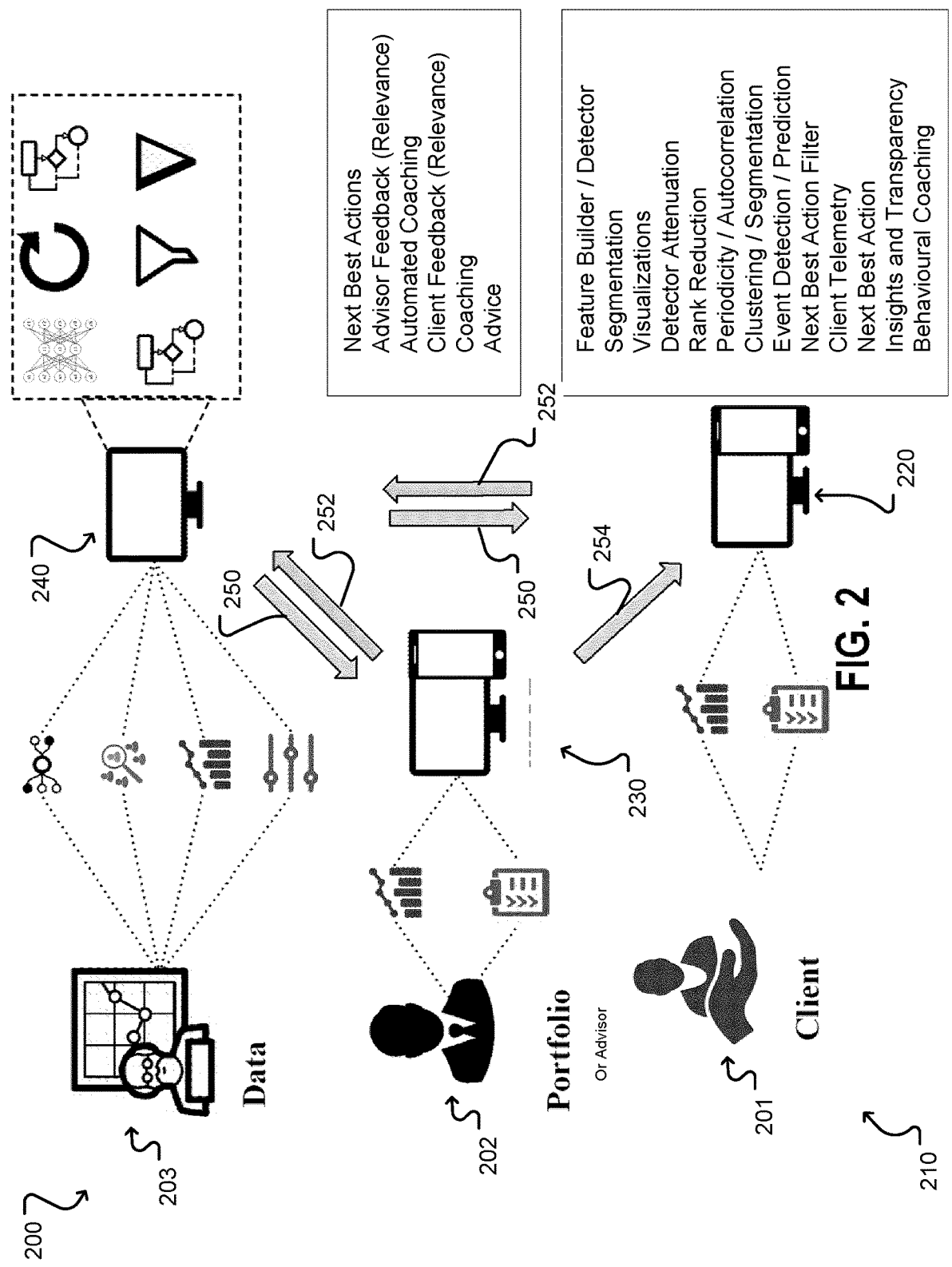
FIG. 2 schematically illustrates interactions between different types of users and various elements of an example wealth management system according to one embodiment.

FIG. 2 schematically illustrates interactions between different types of users 210 and various elements of an example wealth management system 200 according to one embodiment of the present disclosure. One or more client users 201 (such as a client investor or end-client investor) interacts with the system through an engagement layer 220, members of the wealth team, portfolio users 202 (such as an advisor or portfolio manager) interact with the system through an operation and service layer 230, and members of the executive and research team, data users 203 (such as a data scientist or researcher, access on end user devices) interact with the system through an intelligence and governance layer 240.

Engagement Layer

The engagement layer 220 is where client users 201 (access on end user devices) interact with the wealth service. The engagement layer 220 may include a client application that provides an integrated set of engagement channels for client users 201 which enables onboarding, discovery, insights, account self-servicing, and communication with their portfolio user 202 (access on end user devices). The client application may be implemented as (LUNA) HYBRID client application 302 (access on end user devices), illustrated in FIG. 3.

In some embodiments, client users 201 use an investment service, and trust portfolio user 202 to advise and administrate their wealth strategies and products. In some embodiments, wealth management system 200 includes an integrated set of engagement channels for client users 201 which enables onboarding, discovery, insights, account self servicing, and communication with portfolio user 202.

Service and Operations Layer

The service and operations layer 230 enables the core front line and back-office team to collaborate on the day to day business of servicing clients, fact gathering, account management, portfolio management and money movement. The service and operations layer 230 may include an enterprise application that provides tools for team members in different roles such as an advisor (Relationship Manager), a Portfolio Manager, and an Administrator. The enterprise application may be implemented as (HELIOS) HYBRID enterprise application 304 (access on end user devices), illustrated in FIG. 3.

A portfolio user may be an advisor, wealth manager, relationship manager, or other frontline worker in contact with the client and responsible for maintaining the client's profile.

A portfolio user 202 such as a Relationship Manager (RM) is responsible for recommending wealth strategies and services to client user 201. In some cases they will handle the responsibilities of the Portfolio Manager and Administrator. Enterprise application 304 keeps the RM apprised of the status of client accounts and life situations at both the operational and advice level. Enterprise application 304 allows the Advisor/RM to respond to account, portfolio and client life events through a rich set of dashboards.

A portfolio user 202 such as a Portfolio Manager (PM) is responsible for maintaining and rebalancing model portfolios or individual segregated client portfolios. Enterprise application 304 allows the PM to curate a security master of available investment products, set target portfolio weights, or buy and sell products within a client portfolio. Enterprise application 304 monitors portfolios to ensure they are correctly implemented according to governance, and will notify the PM or Compliance of any exceptions.

A portfolio user 202 such as an Administrator is responsible for any back-office and account related activities needed to maintain ongoing service, and effect the directives of the Advisor or Portfolio Manager. Enterprise application 304 enables the Admin to perform fact gathering work, account management actions, reconciliation and information retrieval activities.

The services and operations layer 230 may comprise devices (e.g. having interface dashboards) configured to receive alert notifications, e.g. from the intelligence and governance layer, for decision making support. The alert notifications may alert an advisor (RM, PM, or other individual). The alert notification may inform the advisor of the Next Best Action.

In some embodiments, feedback from the advisor is collected and transmitted to other layers.

Intelligence and Governance Layer

The intelligence and governance layer 240 allows data users 203, such as supervisors and researchers, to understand enterprise functioning, performance, compliance, client diversity and life events. The intelligence and governance layer 240 may be used to deliver recommendations 250 to the integration or engagement layer 220 and the service and operations layer 230, and also receive feedback 252 from such layers. A portfolio user 202 such as a PM may also interact with a client via communications 254 from the service and operations layer 230 to the integration layer 220.

Figure 3:
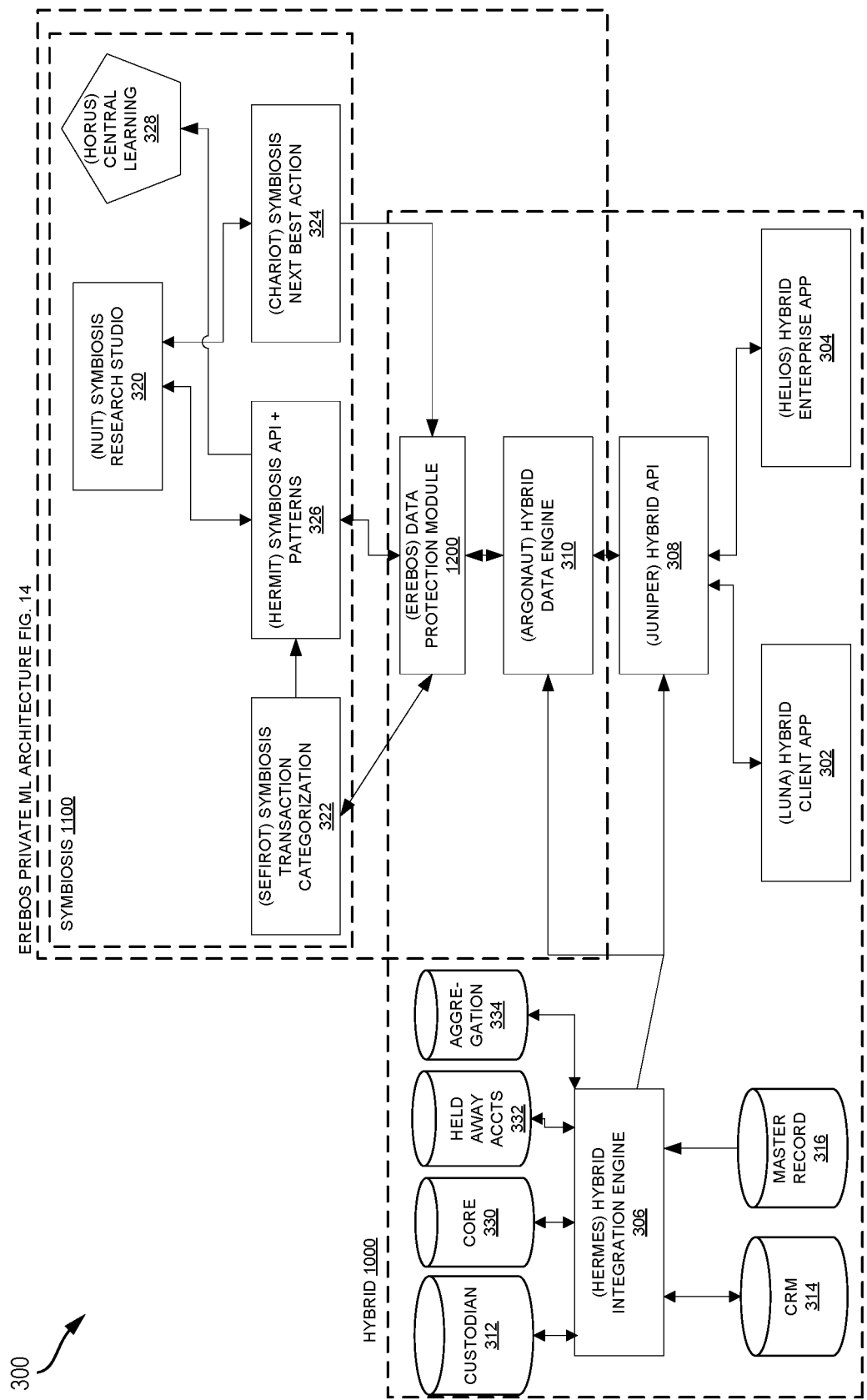
FIG. 3 shows an example high-level architecture of a wealth management system according to one embodiment.

The intelligence and governance layer 240 may also provide summary visualizations on client populations, RM populations, branch performance, and enterprise wide intelligence. Metrics based on real time data, statistics from event detectors and predictive models are presented in a summary fashion. The intelligence and governance layer 240 may include a research studio for use by users in various different roles. The research studio may be implemented as (NUIT) SYMBIOSIS research studio 320 (accessed on end user devices), as illustrated in FIG. 3.

Figure 17:
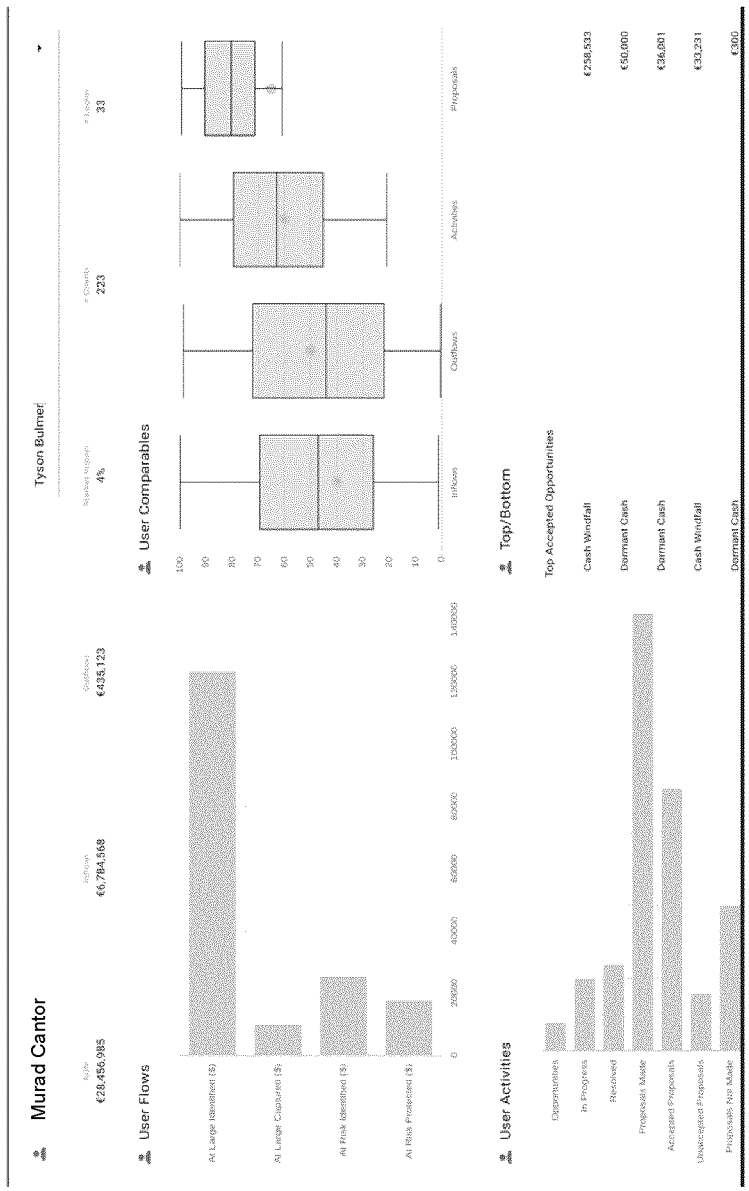
FIG. 17 shows an example screenshot from a research studio, illustrating business intelligence about the clients under management, according to one embodiment.

A data user 203 such as a Team Supervisor oversees a geographic branch, or segment based group of front-line and operational workers. A Team Supervisor is able to assess business intelligence about the clients under management and the performance of the branch/segment team. This information may be presented on supervisor Dashboards. FIG. 17 shows an example screenshot from a research studio, illustrating business intelligence about the clients under management, according to one embodiment.

A data user 203 such as a Compliance Officer can view business intelligence on compliance exceptions and handling for their branch, or if provisioned across the enterprise.

A data user 203 such as a Researcher is able to segment the client population by financial behaviour, and design event detectors that trigger "Next Best Actions" which are provided to the Service and Operations team. The Researcher is also able to design Coaching for the end-client investor. Events are defined in a research studio that enables "ex-post empirical" triggers, as well as probabilistic or predicted triggers.

A data user 203 such as an executive can view business intelligence across the organization on stats pertinent to the Team Supervisor, Compliance officer and Researcher roles. This information may be presented on dashboards designed to create a high level understanding of advisor and client populations, as well as sales and risk information at an aggregate level.

In some embodiments, systems and methods herein may provide for a two way communication between a plurality of advisors and the intelligence and governance layer. The latter layer may be implemented using cloud infrastructure. In some embodiments, the intelligence and governance layer collects data from a plurality of advisors and the client they service. The data may be large-scale data associated with hundreds of thousands or millions of clients. The data so received may be processed using reinforcement learning to determine patterns among clients and in particular detect or predict life facts of the clients. By processing and learning from a massive amount of data, the reinforcement algorithm is able to detect and predict life facts such as marriages, promotions, divorces, births, and other life facts influencing a client's risk appetite and investment preferences. The life facts so detected/predicted are transmitted to the service and operations layers for use by the portfolio user in order to adjust investment preferences of the client.

For example, a birth predicted or detected by the trained network may be used by the advisor to change the risk profile associated with one of a client's goals. By aggregating data from a variety of sources, and using such data from a plurality of clients, may allow a prediction well advance of occurrence of an event.

Development and Integration Layer

In some embodiments, wealth management system 200 may also include a development and integration layer that allows technical personnel to configure and connect the system to existing infrastructure and data, and to extend and customize applications for specific use cases. Wealth management system 200 enables the ingestion of database, API and flat file resources into query-able holistic representations of client finances. An integrator can connect 3rd party and legacy systems to the wealth management system of the present disclosure. Using the system's APIs, and a scheduler, as well as some "off-the-shelf" connectivity strategies, the integrator can, for example, connect the following systems to the wealth management system of the present disclosure: CRM; Custodian; Core Banking (Account+Product API); Messaging/E-mail; Master Accounting Record; Portfolio; Paperwork/PDF e-signing platforms. An integrator may be implemented as (JUNIPER) HYBRID API 308, as illustrated in FIG. 3.

An Extender can utilize the functional and logical core of the system to build custom apps or reports, such as for example: custom robo-advisor, personal finance manager, chatbot, 3rd party business intelligence. An Extender may be implemented as (ARGONAUT) HYBRID data engine 310, as illustrated in FIG. 3.

FIG. 3 shows an example high-level architecture of a wealth management system 300, which may be termed "Responsive" system, according to one embodiment of the present disclosure.

In some embodiments, wealth management system 300 includes "HYBRID" software 1000 modules, as well as "SYMBIOSIS" software 1100 modules, as illustrated in FIG. 3, described in further detail below.

"HYBRID" Software

As illustrated in FIG. 3, in some embodiments, "HYBRID" software 1000 is an enterprise digital wealth advisor software comprised of:

a multi-channel client facing digital engagement surface ("LUNA") a client application 302 an enterprise facing operations and service middleware for enabling wealth team collaboration and service enhancement, ("HELIOS"), an enterprise application 304 a system facing layer that ensures inbound and outbound data, messages and actions are correctly sequenced, and that client and account data is correctly maintained and reflected to system and personnel "stakeholders"; ("JUNIPER"), an API 308, ("HERMES") an integration engine 306, and ("ARGONAUT") a data engine 310.

As shown in FIG. 3, integration engine 306 interfaces to receive data from a variety of external data stores such as custodian 312, CRM 314 and master record 316, and provides the data through API 308 to a client application 302 and an enterprise application 304.

The collection of HYBRID software 1000 may be enabled to:

1) make client investments and finances, as well as the decisions of the advisor, as transparent and understandable to the end client as possible;
2) make client investments and data as clear to the advisor as possible;
3) enable cost effective servicing of clients, administration of portfolios and performance of other operations and compliance activities; and
4) to have an orderly and transparent architecture for achieving—in an iterative agile fashion—the optimal form of the above.

The above are all governed by design that drives organization focus to wealth policy, for example as described herein as Q*.

HYBRID (LUNA)—Client Application

The client application 302 enables customer engagement over web and mobile. In some embodiments, the client application 302 provides one or more of the following datum and visualizations:

A holistic view of balances and cash flows over all accounts;
Performance views of individual accounts and wealth strategies;
Wealth goals, and goal progress;
Historical Transactions and Transfers;
Notification driven insights and behavioural coaching;
Announcements and marketing; and,
A doc vault for reports, agreements and regulatory data.

In some embodiments, the client application 302 allows a user to conduct one or more of the following activities:

Adding accounts;
Adding goals;
Moving money in and out of an account;
Changing personal information;
Chat with advisor;
Schedule Advisor meeting; and,
Updating investment questionnaire.

Figure 4:
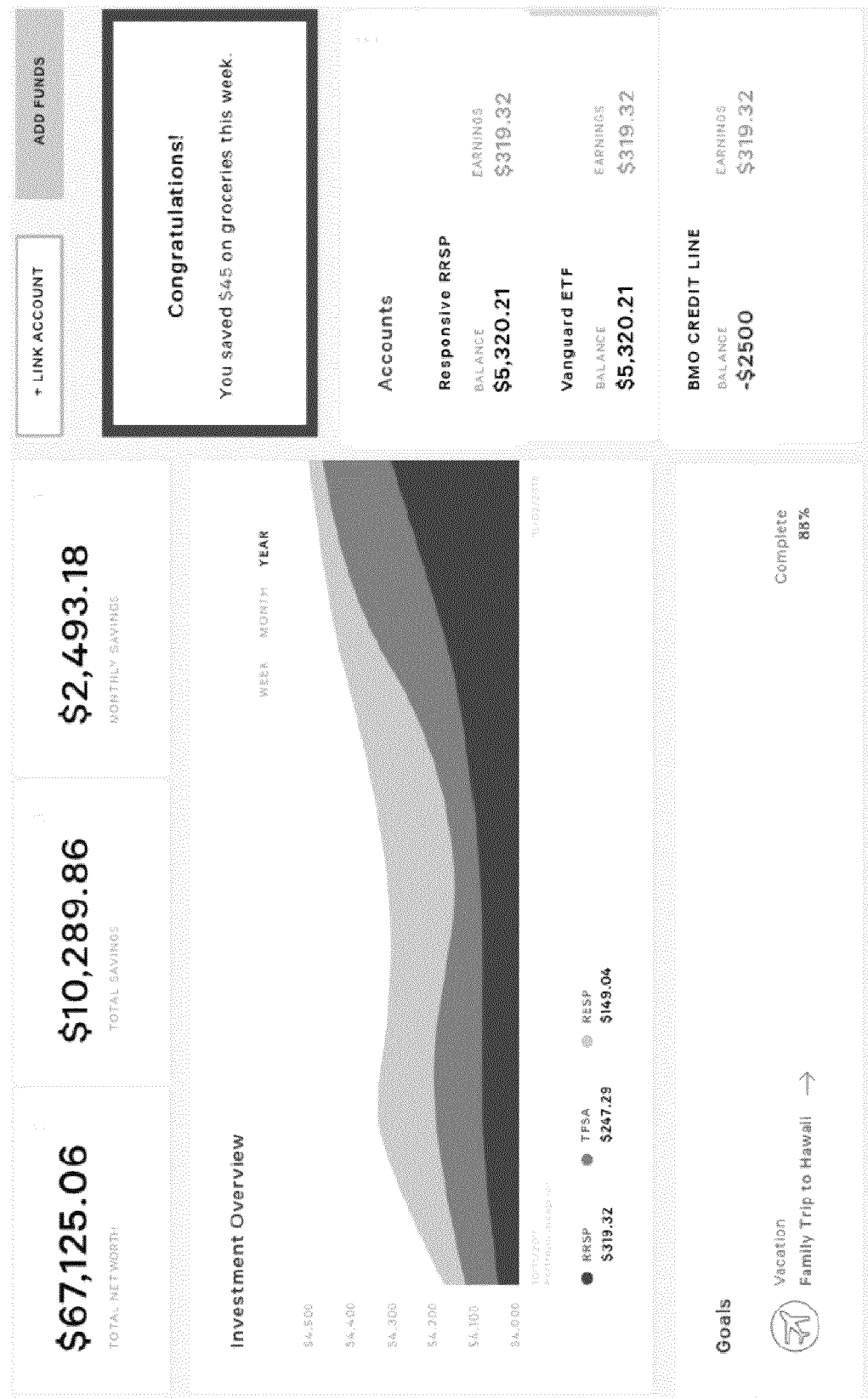
FIG. 4 shows an example screenshot from a client application presented to a client user according to one embodiment.

FIG. 4 shows an example screenshot from client application 302 presented to a client user according to one embodiment of the present disclosure. In some embodiments, the client application provides client views to present a unified and narrative account of personal wealth in order to provide greater understanding, more coherent behaviour and greater personal accountability.

In some embodiments, client application 302 is configured to provide insights and transparency, and behavioural coaching. In some embodiments, Next Best Actions from Chariot can be dropped into Luna as notifications.

HYBRID (HELIOS)—Enterprise Application

Returning to FIG. 3, the enterprise application 304 enables wealth management operations, team collaboration and performance management. In some embodiments, the enterprise application 304 provides one or more of the following datum and visualizations:

Holistic wealth view of client to promote empathy and accountability;

Peer Pressure view to show advisor performance amongst team;

Holistic view of branch team performance for supervisor;

Executive View of Branch Performance;

Executive View of Segment behavior; and

Compliance view of registerable activities: money movement, account creation etc.

In some embodiments, the enterprise application 304 allows a user to conduct one or more of the following activities:

client onboarding;

account servicing;

wealth team collaboration and accountability;

portfolio management;

work and client prioritization; and branch and enterprise operations and performance.

Figure 5A:
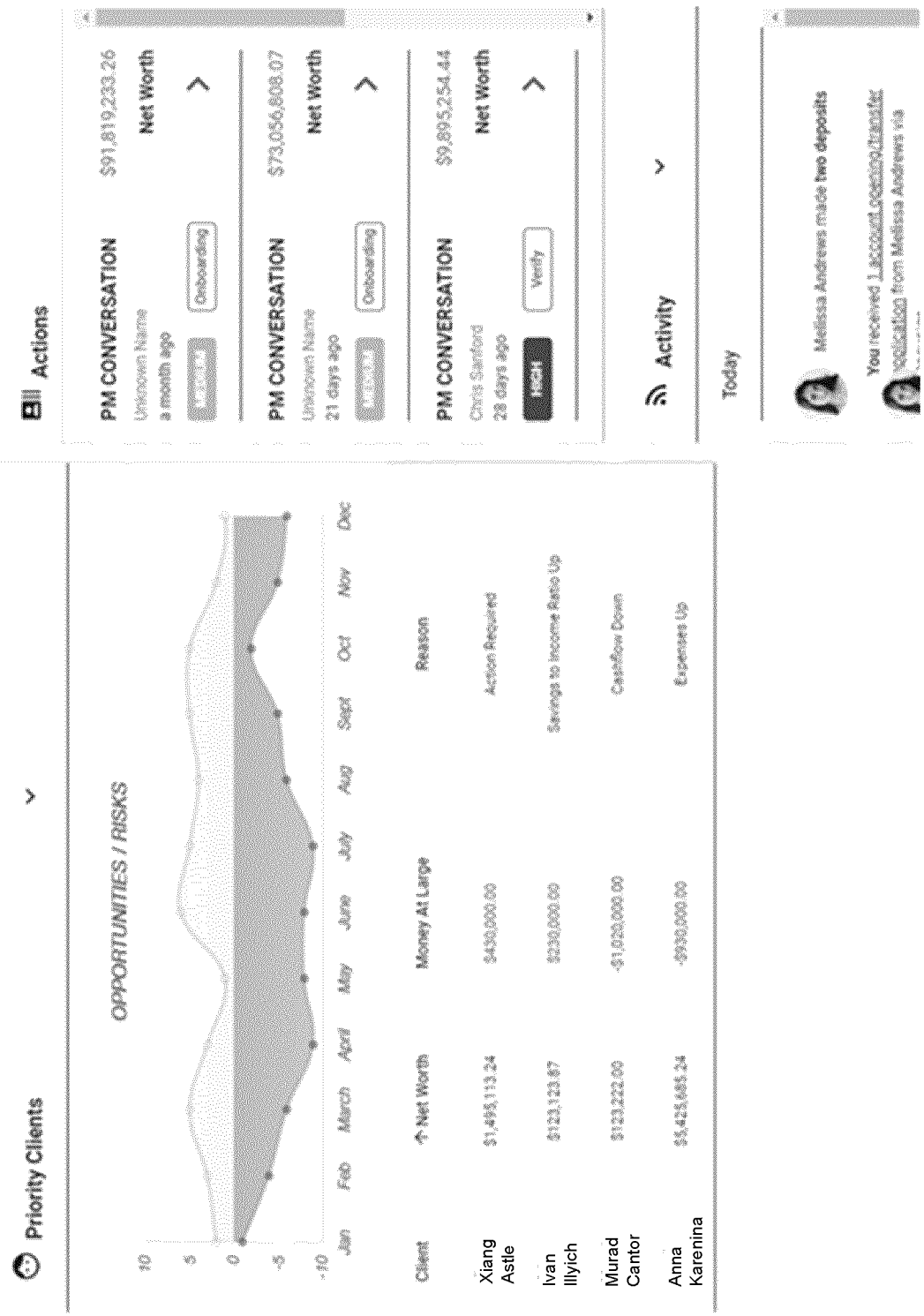

FIG. 5A shows an example screenshot from enterprise application 304 presented to a portfolio user 202 according to one embodiment of the present disclosure. In the illustrated example, the portfolio manager is provided with a graph showing how opportunities and risks for their assets under management vary over time. Below the graph, a selected list of clients with current associated opportunities and risks is shown, which is selected based on any or market events, portfolio events, personal events, other data by intelligent processes controlled by the research studio. On the right, a set of next best actions for the selected list of client is recommended to the portfolio manager. The application may also present the portfolio manager with an activity feed for the selected list of clients, as shown in the lower right of FIG. 5A.

Figure 5B:

FIG. 5B shows an example screenshot from enterprise application 304 of a client holistic view. The client holistic view gives the advisor a sympathetic, coherent and a narrative view of the clients financial persona and wealth strategy in order to drive alignment with a wealth policy, for example as described herein as Q*.

In the example illustrated in FIG. 5B, the holistic view includes a snapshot of client cash flows, balances, goals and commitments as well as a rolling temporal view of the clients finances. The holistic view also enables drill downs into client banking and investment accounts, CRM data, conversational and compliance history, and also shared documents.

FIG. 5C shows an example screenshot from enterprise application 304 of a priority dashboard view, including actions such as "Next Best Action". In the example illustrated in FIG. 5C, the priority dashboard presents advisors, such as portfolio user 202, with a "morning coffee" view of the days work. Work is partitioned into either "Actions" which convey operational tasks by priority, and "Opportunities+Risks" which provides the advisor with a haptic view of potential "money at large", and what actions can be taken to increase or defend assets. An ambient view of account and client activity occupies the bottom right part of the screen.

When an advisor clicks on an "Opportunity or Risk" they receive a next best action, for example, as shown in the example screenshot shown in FIG. 5B, and the option to dismiss, snooze or immediately address the insight. These responses give the system feedback on the actions.

In some embodiments, supervisor dashboards will show the aggregate and combined performance of wealth advisors in a branch on a time series basis. In some embodiments, executive dashboards will show the aggregate and segmentation characteristics of the entire client base, as well as branch summary performance.

HYBRID (HERMES)—Integration Engine

Returning to FIG. 3, integration engine 306 orchestrates the loading and normalization of client banking and investment information from myriad sources, as End-Client data arrives from different sources with different formats, from within and from without a enterprise client's perimeter. As such, integration engine 306 aggregates, schedules and normalizes from different sources. In some embodiments, integration engine 306 provides basic data load reconciliation, and error handling as well as keeping the data team notified.

External data sources may include custodian 312, CRM 314, master record 316, as shown in FIG. 3. Data may also be received from external sources such as a core 330, held away accounts 332, and aggregation 334, as shown in FIG. 3.

HYBRID (JUNIPER)—API

In some embodiments, API 308 provides for one or more of: Onboarding, Account Management, Portfolio Management, Documents Management, Sideload or Historical Load Data API, and CRM synchronization.

In some embodiments, API 308 is an internal service used to collect, store and expose end client data for consumption by the rest of the applications in the system 300. In some embodiments, API 308 transforms product and platform centric client data, into a client centric model, which may be achieved through creating a hierarchy around client balance sheet, and client cash flows expressed in a taxonomy which is immediately legible. In some embodiments API 308 is configured to implement data transformations for mapping data from a product or account centric industrial format, to a client centric format normalized in terms of daily or weekly cash flow activity, and balance sheet from the perspective of personal wealth and planning.

HYBRID (ARGONAUT)—Data Engine

Data engine 310 is configured to collect, store and expose end client data for consumption by the rest of the applications in wealth management system 300.

Data engine 310 may transform product and platform specific client data, into a normalized and rational client centric model. This may be achieved through creating a hierarchy around client balance sheet, and client cash flows expressed in terms which are immediately legible and human understandable.

The kinds of questions data engine 310 answers for client application 302 and enterprise application 304 in a visualization and information needs context, and for research studio 320 in a numerical research context include, by way of example, "How much cash did the client have 2 months ago? How much did they spend on coffee last week?".

In some embodiments, data engine 310 aggregates client data from both external providers and other applications in wealth management system 300. These external providers are third party services that provide wealth management system 300 with an interface to present to users 210 such as client user 201. Connecting to the financial institution data, 3rd party or wealth management system 300 repositories, integration engine 306 retrieves end client's financial data on a routine basis and stores it in the data engine 310 database creating a unified record of that end client's financial persona.

External service providers that wealth management system 300 communicates with may store end client data in a slightly different format which would cause problems were a wealth management system 300 application to receive data from data engine 310 in a format it did not understand. Thus, data engine 310 transforms the externally received data into a consistent, internally defined structure, such as "PERSONA", that the rest of the wealth management system 300 applications reliant on data engine 310 may be programmed to understand.

The end client data may be arranged into four different collections (resources) representing four pillars of an end client's financial "persona". These four collections are: Balance Sheet, Cashflow, Facts and Goals/Plans, forming a "PERSONA" data structure by data engine 310. "PERSONA" may be defined as a data enriched view of data from data engine 310, and in some embodiments, "PERSONA" defines a "financial state" of the user as defined above, and in the "responsive idea", as described in further detail herein.

Balance Sheet

In some embodiments, Balance Sheet is the collection for everything that an end client owns that could be said to be a financial product. For example, savings accounts, checking accounts, investment accounts, loans, mortgages, real estate, private businesses are all products that are a part of an end client's financial portfolio. This list demonstrates that PERSONA includes assets, liabilities and debts as part of an end client's Balance Sheet.

Cashflow

In some embodiments, Cashflow is the collection where anything pertaining to the movement of wealth in and out of the accounts listed under an end client's Balance Sheet is stored. A debit card payment from a checking account, the selling of a stock, the purchase of a house, a money transfer to a family member are all examples of an end client's financial movements classified in a "PERSONA" as transactions. "PERSONA" includes a record of any account's transactions for later analysis by other wealth management system 300 applications as the end client goes about their day-to-day life.

Facts

In some embodiments, Facts is the collection for almost all information that could be used to personally identify an end client. An end client's name, residential address and answers to a question about their risk tolerance are all examples of data that, when examined as a whole, stored in "PERSONA" as personally identifying.

Plans/Goals

In some embodiments, Plans and Goals is personal information concerning an end client's aims in life. An end client's aims may not directly concern money but almost always require the accumulation, accumulation or distribution of wealth. For example, an end client may plan to retire when they are 45 years old so their goal may be to save $50000 every year for the next 12 years to achieve that.

Within wealth management system 300, PERSONA's primary functionality is to collect, transform, store and expose data for further use by other wealth management system 300 applications. There are two applications that make particular use of PERSONA on a regular basis; Hybrid 1000 and Symbiosis 1100.

Hybrid 1000 is a producer for and consumer of PERSONA's functionality. As a producer, Hybrid provides PERSONA with end client data that PERSONA would categorise into the Facts collection. As a consumer, Hybrid requests end client data from each of PERSONA's four collections in its aim to serve its users the most complete financial portrait of an end client possible.

Symbiosis 1100 primarily is a consumer of PERSONA's data; particularly the Cashflow collection. Symbiosis takes PERSONA's Cashflow data for a given end client, further categorising any requested transactional data, and uses the provided data to inform insights and derive conclusions about end clients not as individuals but as demographics or subsets based on shared characteristics (financial or personal).

SYMBIOSIS" Software

As illustrated in FIG. 3, in some embodiments, "SYMBIOSIS" software 1100 is digital wealth advisor software comprised of:
 a research studio 320 ("NUIT")
 a transaction categorization module 322 ("SEFIROT")
 an API and patterns module 326 ("HERMIT")
 a next best action pipeline 324 ("CHARIOT")
 central learning node 328 ("HORUS").

SYMBIOSIS (SEFIROT)—Transaction Categorization Module

In some embodiments transaction categorization module 322 enables categorization of transactional spending data (Checking, Credit, Balance sheet etc.) into behavioural financial categories using both deterministic rules set by humans, and machine based text categorization. The categories in turn can be used as features in the research studio 320.

In some embodiments supervised frameworks such as charRNN can be used by transaction categorization module 322 to effectively label transactions in human meaningful terms. In some embodiments embedded data spaces are estimated and used to enhance the predictive usefulness of the categories as well as semi-/un-supervised machine learning and feature engineering methodologies that handle data sparsity ("zero-inflation"), non-stationarity and quasiperiodicity in time series, and nonlinear variable screening to handle large data dimensionality.

SYMBIOSIS (NUIT)—Research Studio

Research studio 320 enables studies in personality and causality in the financial events of the client population. In some embodiments, the research studio 320 is designed for discovering financial client personas and archetypes, and to detect ex-post empirical events, and a priori predictions that have meaning/value to the advisor and clients in determining a wealth strategy. In some embodiments, the research studio 320 enables the design of Next Best Action pipelines that send actions and insights to both client and advisor based on the events above. In some embodiments, the research studio 320 decomposes the investigation of personality and event into the following craft disciplines:
 Feature Builder/Detector;
 Rank Reduction/Embedding;
 Periodicity/Quasi periodicity/Autocorrelation;
 Clustering/Segmentation;
 Visualizations;
 Event Detection/Prediction+Detector Attenuation;
 Next Best Action Designer; and
 Updating of errors/gradients from Models running "in the wild".

In some embodiments, the ultimate output of the research studio 320 is an actionable insight which can be dispatched to the relationship manager via the enterprise application 304 or the client via the client application 302 using next best action pipeline 324.

In some embodiments, research studio 320 enables feature selection, event detection and the design of "Next Best Action" pipelines 324 that dispatch actionable insights to users of enterprise application 304 and client application 302. In some embodiments, research studio 302 is targeted towards feature analysis and curation, and the design of filters and event detector pipelines.

Apart from providing some methodologies for discerning segment and event, research studio 320 also provides a flexible pipeline framework that extends into proprietary research methodologies. The goal may be to maintain a balance paradigm tasks: feature selection, feature enhancement, grouping and prediction, while permitting new and hand crafted work that can function as a "plug in" in the existing pipelines.

If "power users" want to go beyond "plugging in" to "plugging out", this is enabled via API and patterns module 326.

Research Studio—Features Pipeline

A features pipeline of research studio 320 may enable a researcher, such as data user 203, to rapidly assess the quality and status of features and to gather them into groups of interest for usage down the line.

In some embodiments, model structures, workspaces, experiments, parameter metadata, and other work products resulting from usage of the research studio 320 will be saved and versioned to allow easy sharing of established practices and models across the workplace.

Feature Analysis

In some embodiments, raw feature analysis enables a researcher to rapidly audition features according to univariate analysis, time evolution properties, and information affinity measures with respect to a target feature.

The analysis panel makes use of small multiples and summary stats for rapid assessment, as well as popup detailed views on a given factor for deeper consideration. The intent is to give the researcher the ability to rapidly assess central tendency, modality and basic stationarity.

The Raw Feature panel also enables the researcher to gather and create list of "candidates features" for further investigation in other pipelines. For example the researcher might gather candidates for a custom built feature, or covariance analysis later on. The candidate list can then be accessed conveniently in another workflow by a name of choice.

Periodicity/Quasiperiodicity Analysis

Quasiperiodicity/Periodicity Analysis focuses on the questions of "is it a cycle?" or "is it a habit?". Payroll is by design a cycle. Groceries or "retail therapy" are to lesser or greater extents habits. Analysis of season, trend, cycle, and quasiperiodic components (e.g., inter-event intervals) may be achieved through windowed statistics describing periodic and quasiperiodic statistics (quasiperiodic refers to a regular pattern of recurrence with a random component that does not lend itself to precise, deterministic characterization) as well as multivariate approaches appropriate for periodic and quasiperiodic data (windowed cross-correlation, cross-recurrence, vector autoregressive, deep neural networks, recurrent neural networks). This is mostly in service of feature engineering for further predictive analysis.

Further frequency analysis may be achieved using wavelet and other multiscale approaches to achieve accurate identification of multiscale oscillations in time and frequency, and Stuart-Landau methods to estimate phase and coupling relationships between periodic/quasiperiodic behaviors. These, along with periodicity/quasiperiodicity statistics, can be utilized to detect regularity of weekly or month behaviors, and/or phase analysis of group behaviour. For example: when de-phased by something like "salary check" or "rent payment" most people probably have periodic/quasiperiodic behavior around paying bills and buying groceries. Such "phase-locking" of individual behavior to common life events allows us to time lock behavior across clients to build powerful models of behavior from large asynchronous data sets, where model inference might otherwise be underpowered.

Feature Builder

In some embodiments, the feature builder enables the construction of hand crafted simple arithmetic features using a straightforward visual interface. This may be useful for constructing "kitchen tables maths" whose usefulness in an wealth context should not be discounted. For example: the feature builder enables the construction of simple ratios like "debt to net worth" or "discretionary spend to income", which can be used in event detection further down the pipeline.

The feature builder can also be used to "plug in" a custom feature extraction or data enrichment process to create value added features.

Figure 16:
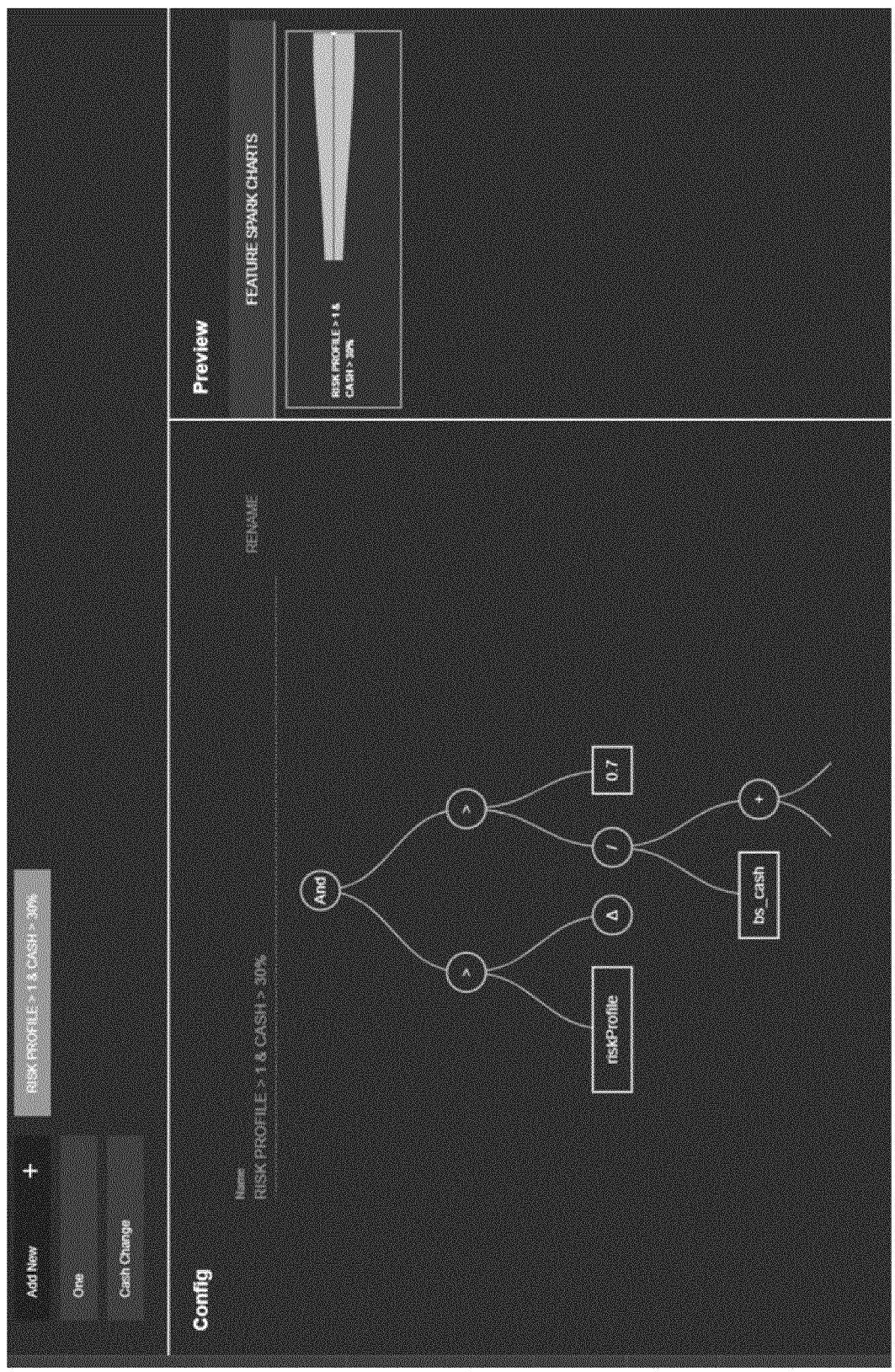
FIG. 16 shows an example screenshot from a research studio, illustrating a feature builder example, according to one embodiment.

A feature builder example is shown by way of example screenshot from research studio 320 in FIG. 16.

Event Relevance Framework

Using a representation like FIG. 16 to randomly, parametrically, or manually build a binary univariate thresholding function on a single feature, or multivariate separating hyperplane on salient features from client state, it may be possible to build a model that will detect labelled events that are relevant to a wealth advisor. Based on some initialization of the threshold/hyperplane, an event will be detected and dispatched to the advisor.

Figure 5D:
Figure 6A:
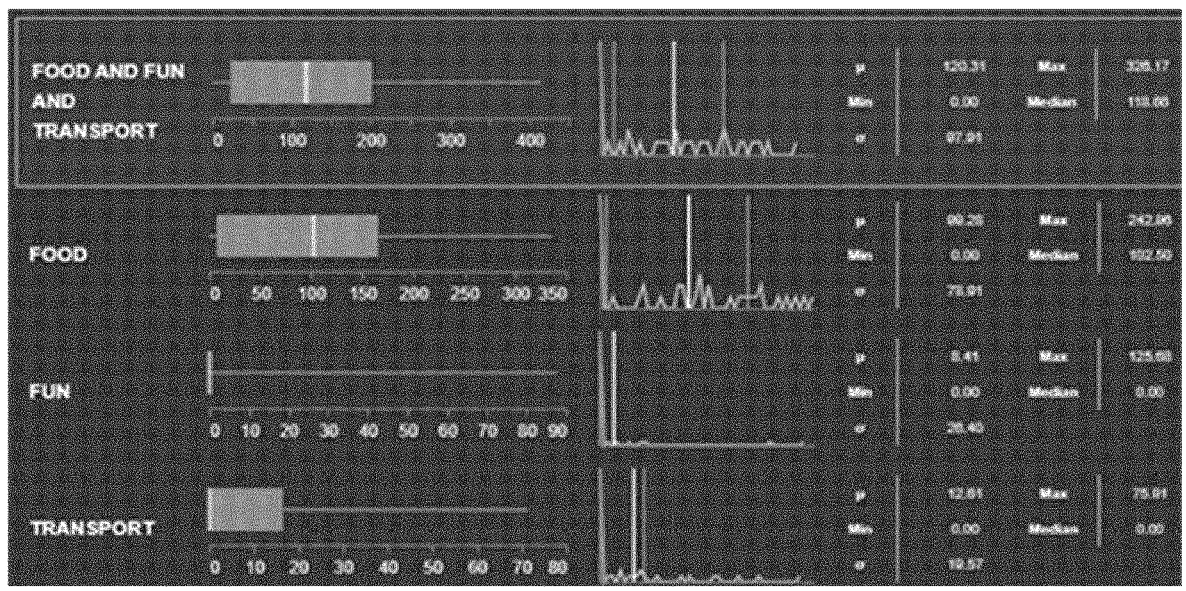
FIGS. 6A, 6B and 6C show example screenshots from a research studio presented to an analyst user according to one embodiment.
Figure 6B:
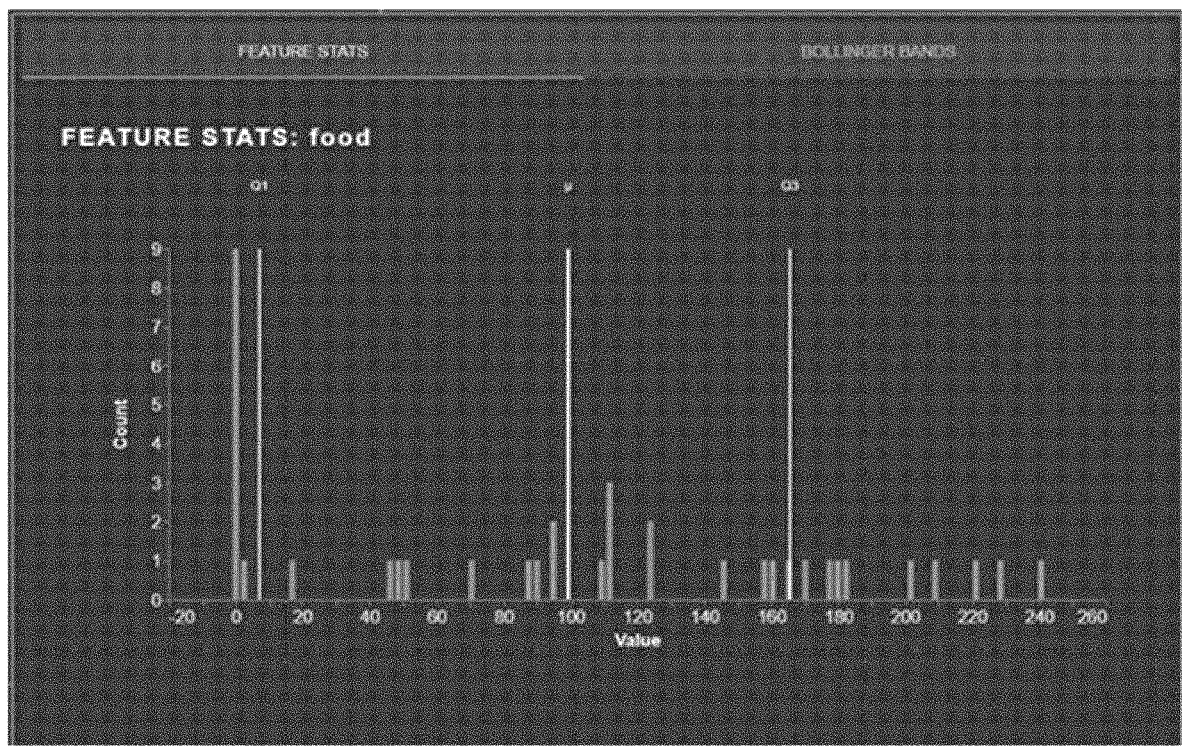
Figure 6C:
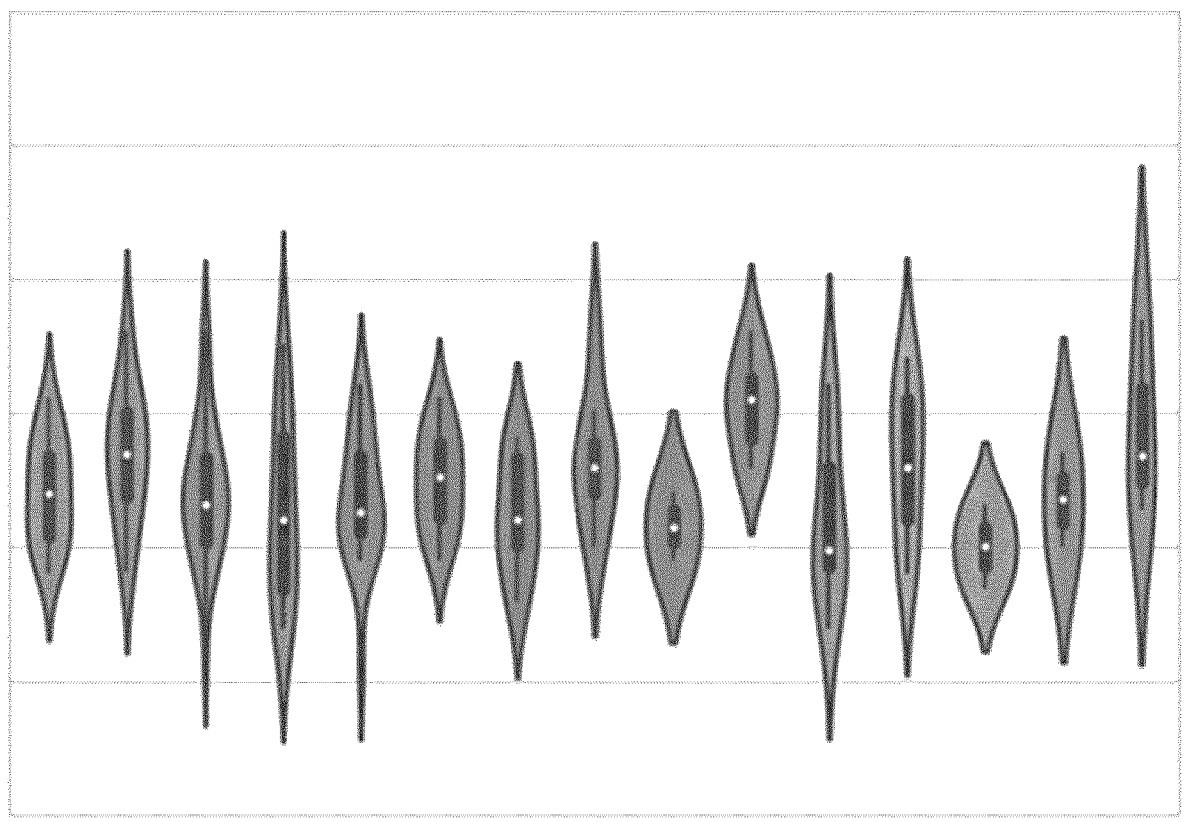

The advisor can use feedback mechanisms diagrammed in FIG. 2 and FIG. 5D to rate the event highly relevant (resolved, contact client), somewhat relevant (snooze) or not relevant. These labels could, for example, correspond to multinomial categories or values on the unit interval that could then be used in standard regression, supervised learning, and or generalized linear models. The bias for false positives or false negatives, recall, precision, etc. could also be adjusted by supervisors for events deemed more or less important at an enterprise level.

Rank Reduction, Embedding, and Feature Selection

In some embodiments, rank reduction and/or embedding enables the compression of a candidate set of features into a reduced dimension space or more favorable representation for future use in clustering or prediction. This is critical not only for generating views of the data that show meaningful, intuitive patterns governing the largest effects in the data, but also for overcoming the "curse of dimensionality", where estimation of an exploding number of parameters (for example, windowed correlation matrix estimates or deep neural network weights) becomes intractable given limited data.

Preprocessing large data sets before further analysis, either by projection onto low dimensional manifolds (with, i.e., matrix decomposition, autoencoders, nonlinear embedding) or target-guided low rank methods (multi-view analysis, preconditioning with supervised PCA) greatly improves downstream parameter estimation quality by combating the "curse of dimensionality" and leading to phase transitions from bad to good parameter estimation. It may also embed the data in spaces more favorable for separation or prediction in further analyses.

In very-large, nonlinear data sets, these low-rank methods may be combined with nonlinear variable screening methods to first reduce effective data dimensionality. For example, model-X knockoff feature screening (a new approach allowing valid inference from limited samples in settings in which the conditional distribution of the response is arbitrary and unknown). This allow strict control of false discoveries during the screening process, while effectively de-noising and reducing the feature-space dimensionality in a data-driven fashion. Other nonlinear variable screening procedures using univariate or bivariate statistics or models to relate predictors to the target variable on held-out validation data may also be employed.

Research Studio—Segmentation Pipeline

A segmentation pipeline of research studio 320 may enable the partitioning of groups based by behavior.

Clusters/Segments

Figure 8:
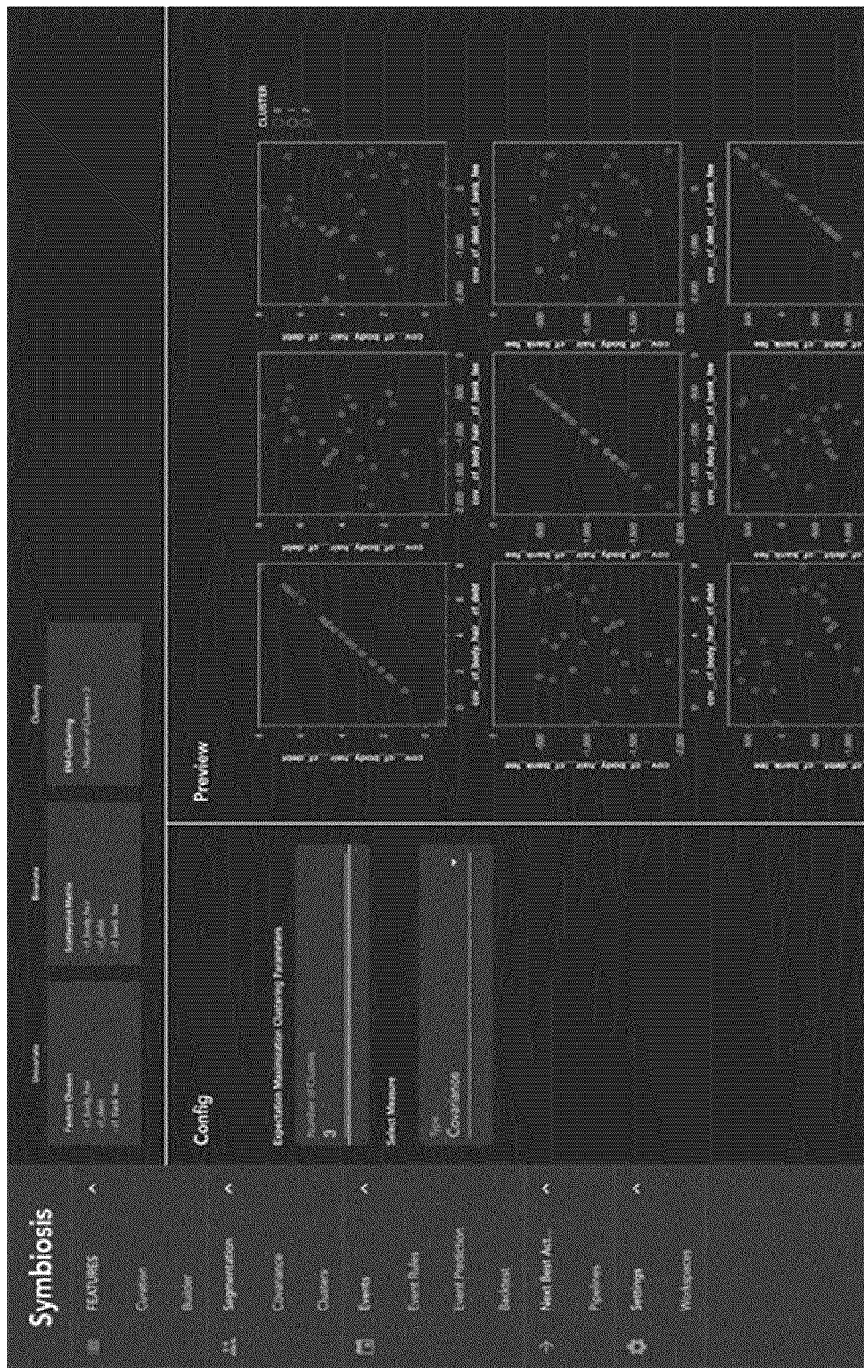
FIGS. 8-12 show example screenshots from a research studio presented to an analyst user according to one embodiment.

A clustering example is shown by way of example screenshot from research studio 320 in FIG. 8.

Personalities

Figure 9:
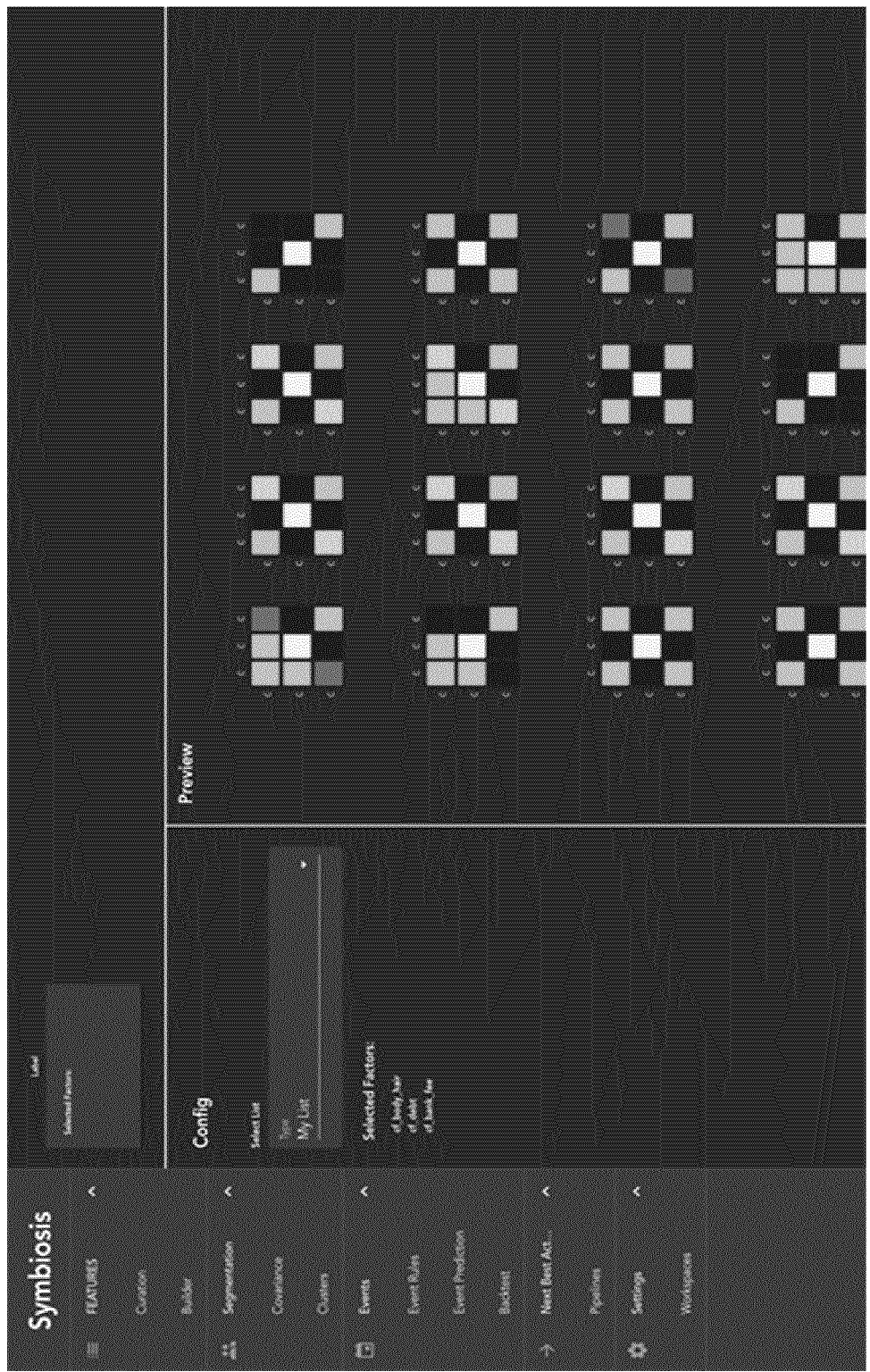
Figure 10:
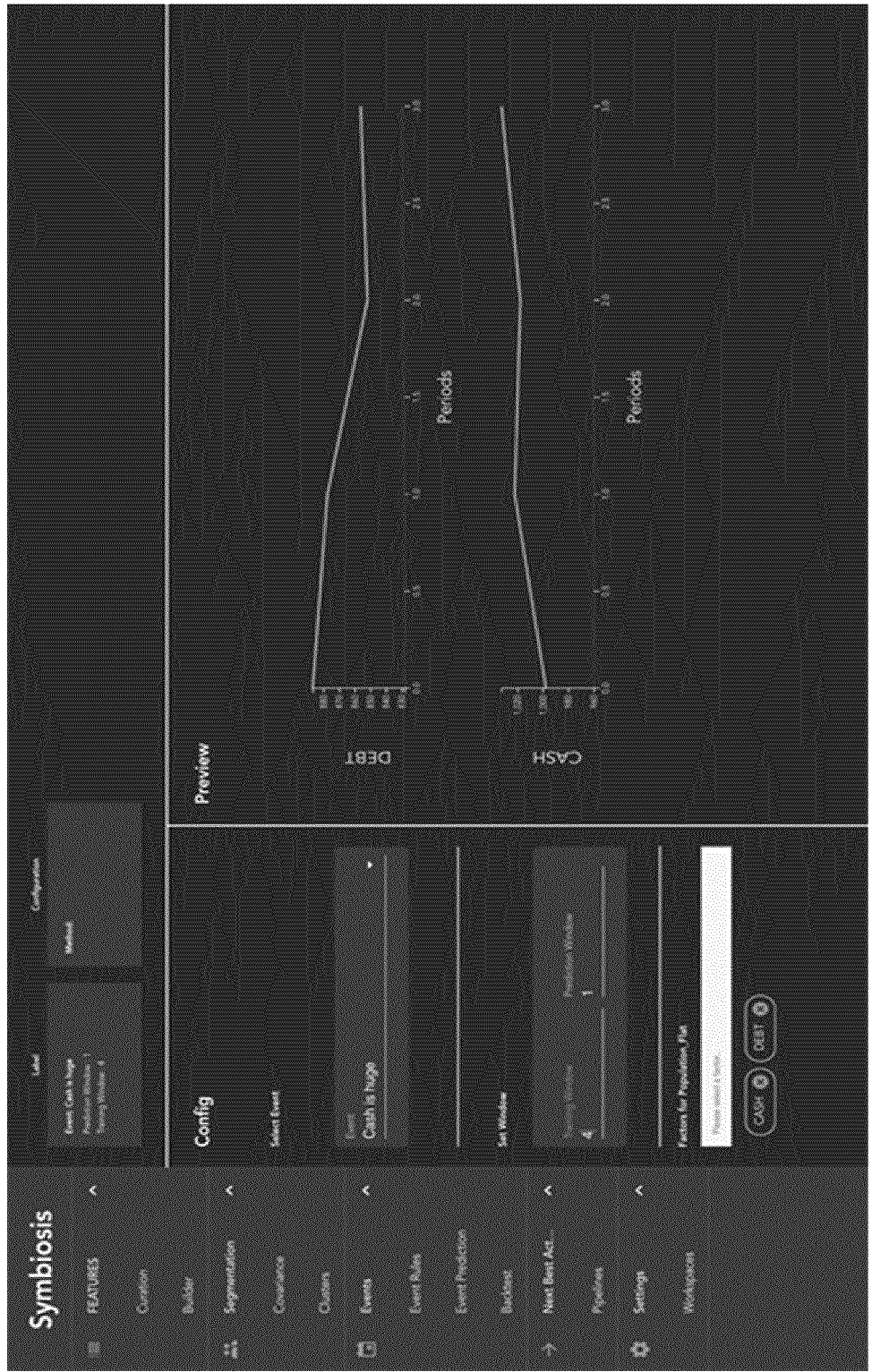
Figure 11:
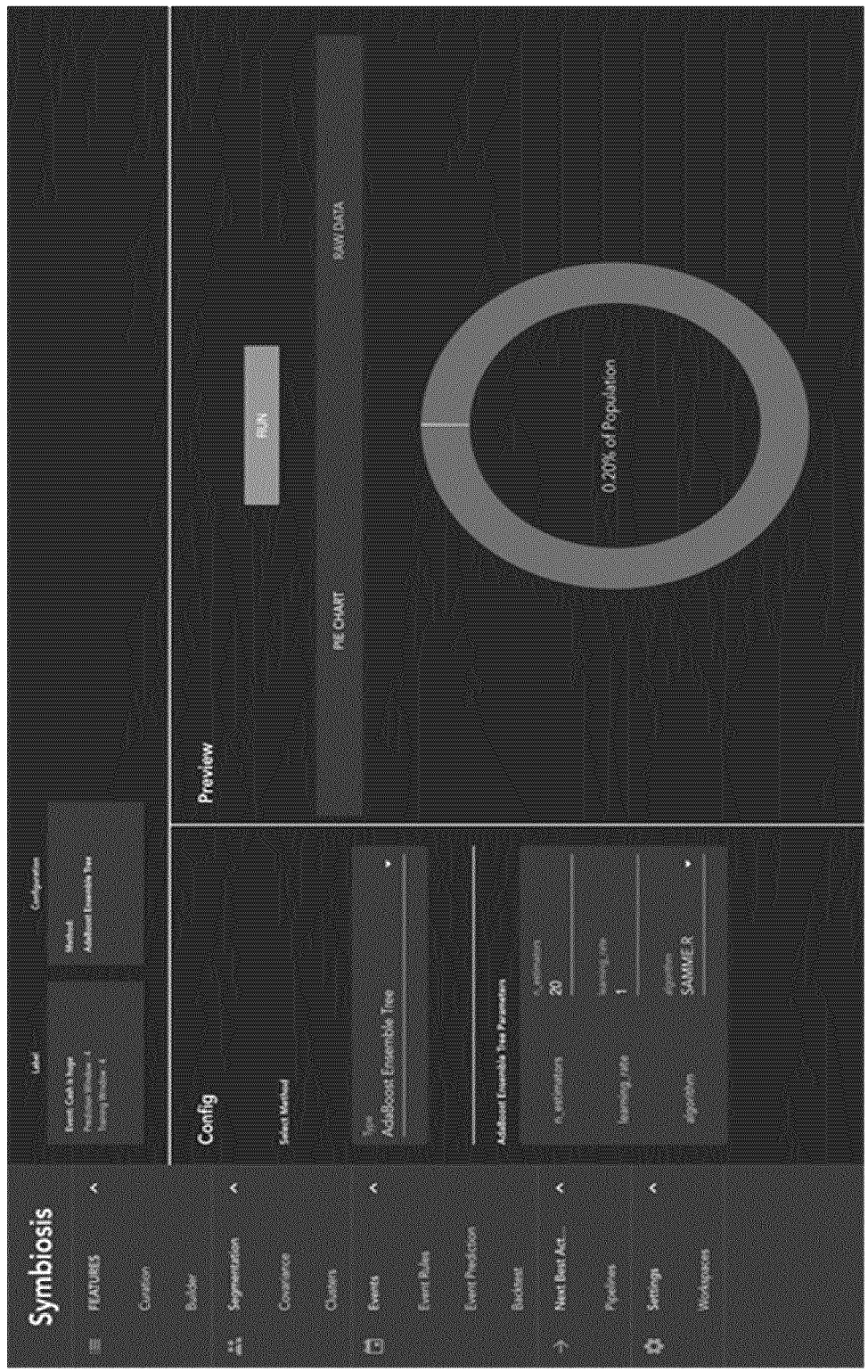
Figure 12:
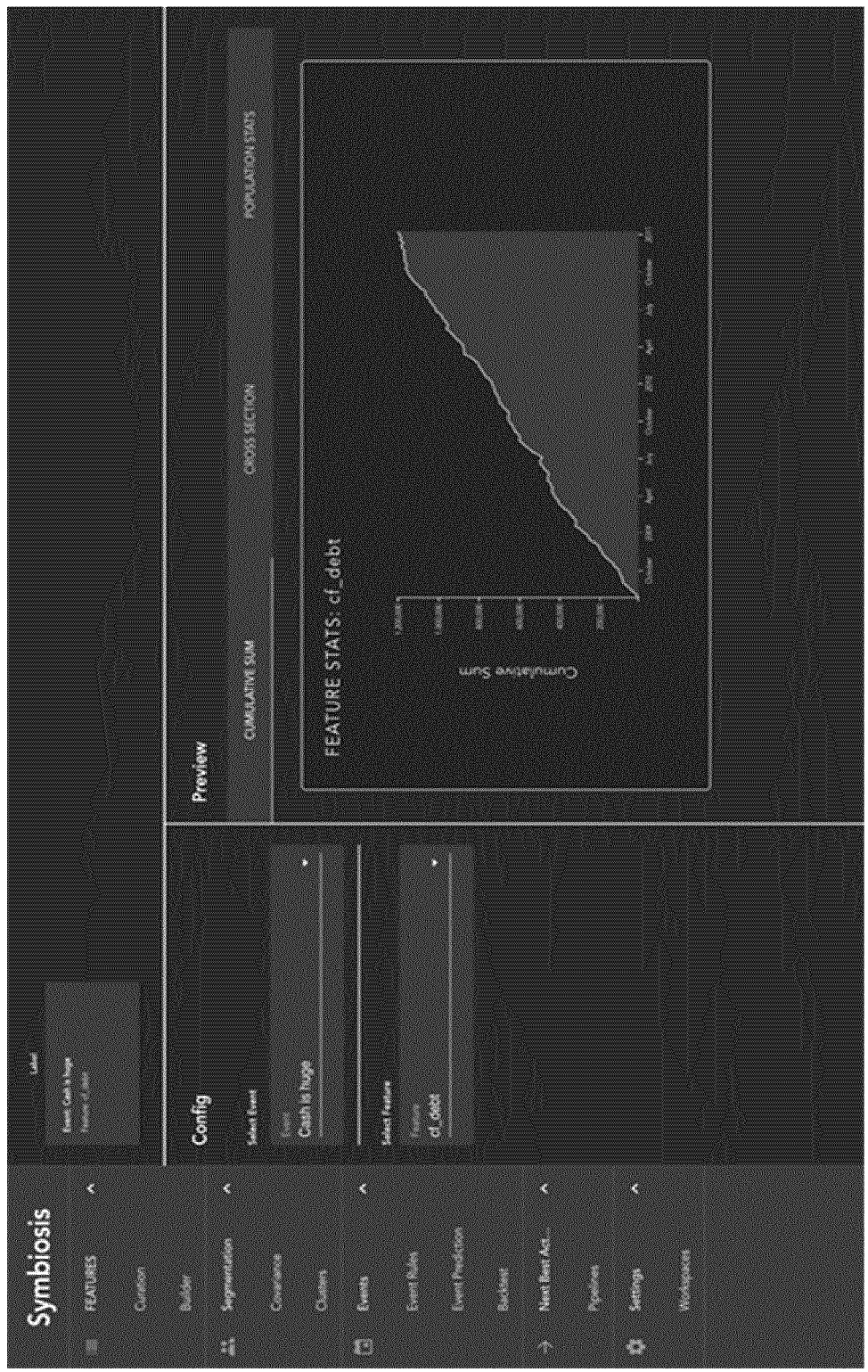

A personalities analysis is shown by way of example screenshot from research studio 320 in FIG. 9. In such analyses, we visualize weights associated with a user's membership to different clusters of users identified by unsupervised or semi-supervised learning, as well as correlations between these different low-dimensional embeddings of user data. This allows us to visually present different "financial personality types" graphically using summaries of the relationships between their financial behaviors.

Research Studio—Events Pipeline

An events pipeline of research studio 320 may enable the detection of events or actions performed by a client.

Empirical Detector

By modeling the past behavior of individual or similar groups of clients, models may be built that detect when client behavior has deviated significantly from its usual distribution. Event (or "novelty") detection algorithms (e.g., one-class SVM, isolation forests, local outlier factors) are used to identify events that stand out relative to past behavior (appropriately preprocessed and time-windowed). Detection of feature/time point/user "novelty" may be used as an end goal or as features input to another prediction algorithm.

Predictive Detector

Beyond just detecting deviations from past behavior in clients, it is highly useful to predict future actions. This requires modeling similar behavior across similar clients within the current regime. For example, to predict the probability that Mr. Smith is going to pull money out of savings, he may be compared to his own past deposit/withdraw behavior as well as to clients with similar behavior who have pulled money out in the past (by, e.g., regressing on prior behavior across a large number of clients, potentially time-locked using the periodic/quasiperiodic alignment methods described previously) and then use this model to predict the likelihood of Mr. Smith making a withdraw based on Mr. Smith's current state.

Predicting Future Events, or Determining Probability of Unobservable Current Events Using Supervised Learning Labelled events on historical client data may be used in a supervised learning context to predict future events, or if a client's state is not completely observable (we are missing a bank account or life facts like marital status or job status) determine whether it is probable an unobserved event has happened (missing data imputation by supervised learning). In this context a supervised learning craft may be applied to the historical client state using lagged historical data as our independent variables, and an advisor relevant label as the prediction target.

For example, a model may be built that would predict whether a client will retire (life fact: employment status) in the next 3 months, based on the past 6 months of cash flow transaction data. Another example would be trying to predict if a client has received or is likely to receive a large cash windfall (cash windfall >$50K in operating account) to an unobservable bank account. Finally we might look at the 9 months of client state leading up to the event of a client leaving the service to build a predictive model for client redemptions, and use this model to predict and avoid future redemptions.

In some embodiments, the supervised learning pipeline will consist of a "data pipeline", consisting of (1) data loading, (2) preprocessing and feature estimation, (3) supervised variable screening to reduce data dimensionality, (4) classification (or probabilistic classification) to predict which elements in the target variable will be zero, and which nonzero (or the likelihood of each), (5) magnitude prediction for nonzero target variable predictions, (6) k-step ahead prediction using the model fit using the previous steps (and sometimes re-fit for each new time point). This pipeline engineers a number of potentially relevant features, then reduces the dimensionality of this predictor spaces using variable screening (to reduce computational cost and reduce the effects of the "curse of dimensionality"), then uses a combination of classification and regression to deal with the fact that much financial behavioral data is "zero-inflated" (a significant fractions of outcomes are zero-valued), and finally uses k-step ahead (in time) prediction for model assessment and to determine Next Best Actions.

Backtest on Event Impact to Variable in Question

Given the ability to segment a financial population into "in" and "out" groups based on a detected or predicted event, it is possible to test the impact of that label on another feature. For example, it may be desirable to know "What is the average savings rate for those who spend more than $50 a week at cafes vs. those who don't".

A backtest showing the impact over different periods on an aggregate or average basis, as well as the "in" vs "out" spread may let researchers determine if an event detector has commercial value.

Detector Attenuation

Despite careful engineering, thresholds in the empirical or predictive detectors may benefit from in situ adjustment in most cases, due to differences between branches, changes in regime, particular advisor preferences, etc. By 'closing the loop' and incorporating direct feedback from advisors on undesired outcomes, it is possible to use advisor feedback about recommended actions to actively improve the thresholds used in event detection and prediction. For example, Mr. Smith pulls some money out of his savings, triggering a notification to be sent to Mr. Smith's advisor. However, this event is less important to the advisor that the algorithm determines, and she would like to not get warnings about such amounts in the future. To fix this the advisor, such as portfolio user 202, clicks a 'not-relevant' button in our interface and this modestly adjusts the sensitivity threshold for that advisor (and potentially the model for multiple advisors) on the notification sensitivity parameter.

To avoid missing opportunities due to threshold over-correction (i.e. becoming too conservative), a fixed number of 'non-relevant' clicks may be provided as would fit a good trade off between type I (false positive) and type II (false negative) error and/or estimated advisor utility curves. As importance ranking of Next Best Actions in general involves setting importance thresholds, aggregate incorporation of advisor feedback may tighten performance over time to better fit what matters most to the event detection domain and regime.

Research Studio—Next Best Action Pipeline

A Next Best Action pipeline of research studio 320 may enable the generation of a Next Best Action, for dispatch of output of the research studio 320 (for example, an actionable insight) to client application 302 of enterprise application 304 by Next Best Action pipeline 324.

In some embodiments, Next Best Action pipeline may include Next Best Action Building and Learning (definite telemetry, active vs. silent).

Research Studio—Visualizations

FIGS. 6A-6C and 10-12 show example screenshots from research studio 320 presented to an analyst user according to one embodiment of the present disclosure. In some embodiments, the research studio 320 provides visualizations designed to achieve one or more of the following:

- create understanding of central tendency, time evolution and cyclicality of financial decision making across a population;
- render if certain personality cohorts are practically separable based on behavior;
- render and ordinate the covariance structure of behavior by individual;
- render the prevalence of events or behaviors;
- render the impact of events or behaviors; and
- render meaningful changes to behavior regime at a point in time.

In some embodiments, novel visualizations related to the tracking of personalities and their clustering across large data sets over time may be developed using learned, low-dimensional projections of the data that best separate the personalities (e.g., spectral embedding, autoencoders) within a sliding window, allowing tracking of cluster movement over time as well as investigation of how variables and individuals contribute to particular clusters.

Figure 13A:
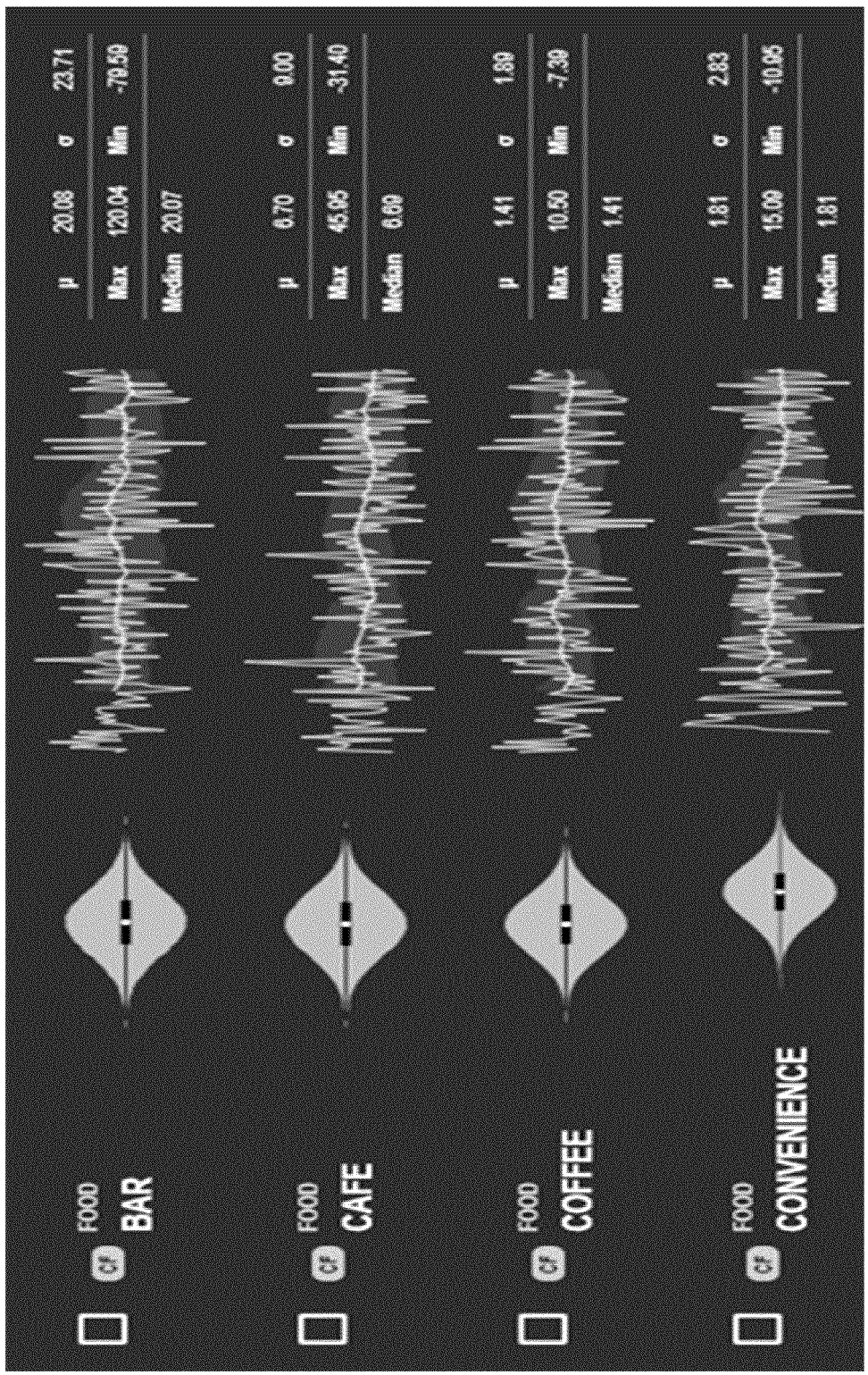
FIGS. 13A-13O show example screenshots from a research studio, illustrating visualizations according to one embodiment.
Figure 13B:
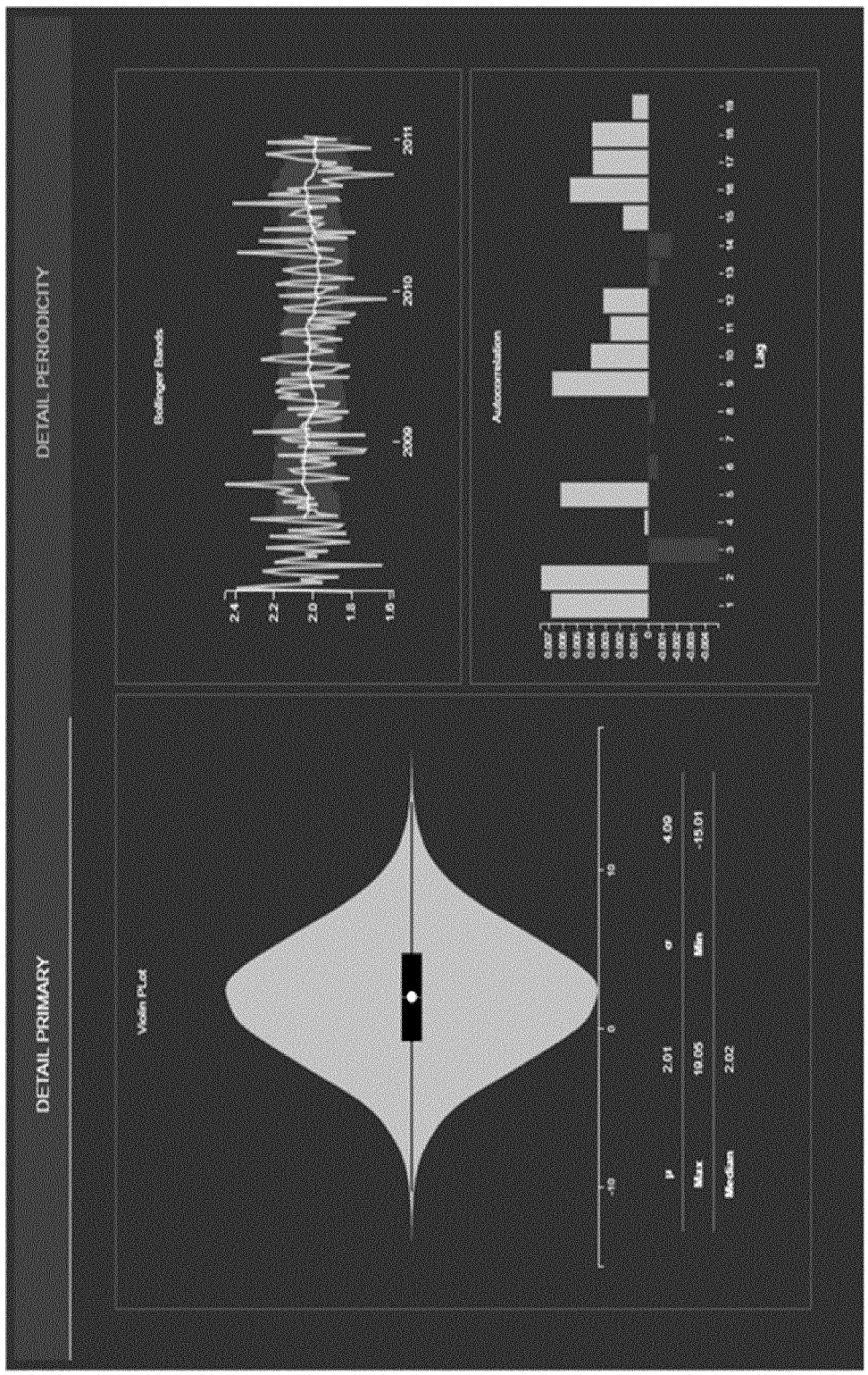
Figure 13C:
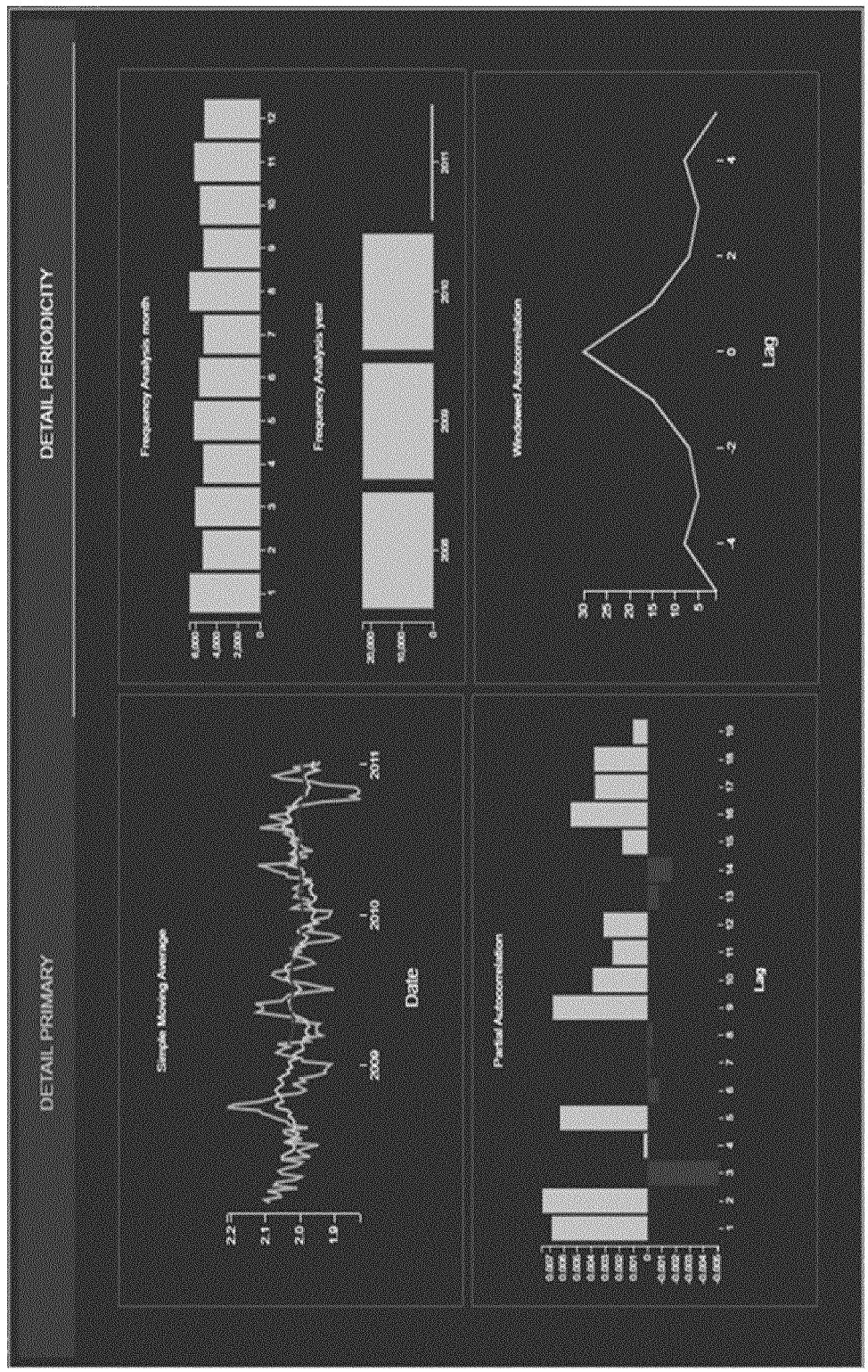

FIGS. 13A-13C illustrate examples of such visualizations, in an embodiment.

FIG. 13A illustrates an example screenshot from research studio 320 of feature analysis. FIG. 13B illustrates an example screenshot from research studio 320 of a detail view of feature analysis of FIG. 13A. Violin plots illustrate distribution of value—x-axis is the value of the transaction. As shown, Bollinger bands provide an analysis of "seasonality"—y-axis is amount/value. The autocorrelation plot is used to identify patterns.

FIG. 13C illustrates an example screenshot from research studio 320 of a periodicity analysis.

SYMBIOSIS (CHARIOT)—Next Best Action

In some embodiments, next best action pipeline 324 allows for detected events to be dispatched to RMs or Clients as Next Best Actions. In some contexts, organizations may not have the research capacity to make the most of the research studio 320, and will instead opt to use pre-baked event detectors incorporated into the next best action pipeline 324. Such organizations can choose to activate off the shelf set of events/next best actions, determine the actions and policy around the events, but rely on the system 300 to attenuate and adjust models. These organizations could consume the insights directly through the enterprise application 304, or through their own wealth platform or CRM via the API 308.

SYMBIOSIS (HERMIT)—API and Patterns Module

In some contexts, certain organizations will possess elite research know how and talent and want to integrate their own models and processes. In some embodiments, API and patterns module 326 allows research studio 320 to be used as a plug in system for custom segmentation, features or predictions, or a plug out system to effectively route data to external processes. In some embodiments, the research studio 320 keeps feature libraries and useful modelling frameworks organized, but allows for bespoke value add craft in a flexible fashion.

In some embodiments, API and patterns module 326 enables research studio 320 to be used as a plug in system for using research studio 320 methods in another pipeline or application, or a plug out system to effectively route data to processes outside research studio 320. In other words, it is an API for interfacing with the research studio 320 pipeline toolkit. Thus power users either wishing to incorporate a research studio 320 pipeline into their own analytical code, or import custom code for their own methods into a NUIT pipeline will be able to do so using API and patterns module 326. This may be enabled by using a Python-based, standardized syntax with modular structure.

By way of example, different modules for each pipeline step (plug in) may include: hermit.lowRank; hermit.timeSeries; hermit.cluster; hermit.detect; hermit.classification; hermit.regression; hermit.NBA. In some embodiments, wrappers/interfaces base structures may be provided for Amazon Lamda, for example.

By way of examples, modules for integration with Amazon AWS (e.g. CodePipeline and Lambda) and Google Dataproc clusters: hermit.aws; hermit.gcloud.

A suitable data structure is contemplated for outside (plug out).

SYMBIOSIS (HORUS)—Central Learning

In some embodiments, in order to provide increasing value for all clients, from client data across privacy zones, the system 300 collects and store non-personally-identifiable information in order to enrich summary statistics and baseline models. In some embodiments, the system 300 employs several strategies to collect this summary information at central learning node 328, which may include one or more of the following:

- Retention of k-anonymized stats;
- Retention of feature distributions by demographic category (e.g. age, sex, city_v_suburb etc.);
- Retention of variational auto-encoders and other "compressors";
- De-identification and homomorphic encryption;
- Retention of covariance matrices across demographic sections; and
- Retention of rank reduced feature sets.

"Use Case"—Wealth Policy

Wealth management system 300, or components thereof, may be configured to provide personalized and adaptive wealth strategy to a client such as client user 201. In some embodiments, data such as investment strategies and capital plans may be used in constructing a point-in-time wealth policy Q* for a client.

In some embodiments, a wealth policy Q* may be dependent on:

- Material—for example, balance sheet and cash flow—financial facts about the client, life stage, employment situation, family situation (state s)
- Client's short, medium and long term intentions and goals (state, constraints, penalties)
- A capital commitment plan towards goals (policy it)
- Behavioral insights about people in general, and client specifically (state, bias and discount)
- Risk and Return assumptions about portfolios of assets. (Expected MPT Return R or $R_p$)

The client's non-financial assets and salary/career may be considered as cash flow instruments, as part of their master portfolio.

In determining a wealth policy Q*, wealth management systems described herein may provide client, advisor and organization with situational awareness of, and guidance on: the client's wealth strategy (Asset allocation, Saving and spending plans, Scheduled life events, Tactics for unplanned life events, Insurance policies), client financial and life facts, client financial behaviours.

A wealth policy may thus be represented under the basis of Reinforcement Learning and Modern Portfolio Theory as: $Q^\pi(s,a)=E[R|s, a, \pi)$, which is a way of expressing the expected return on an action a taking in state s, followed by a subsequent policy π. The client creates a policy of capital allocation to specific goals based on risk/return assumptions of assets and cash flows. In some embodiments, an advisor/client team make quarterly (4) or monthly (12) such actions a year. Reinforcement learning can progress from rewards/penalties discussed, as well as human-in-the-loop AI feedback as diagrammed. In some embodiments, full data capture of client state and advisor action may be achieved as a result of using wealth management systems as described herein, as well as rewards/penalty metrics.

An action a may be defined as the choice to rebalance a portfolio to a particular model (but not necessarily the internal management of the model itself) of investment or insurance assets, and/or a decision to contribute or withdraw capital from a portfolio from or to a cash operating account. An action a can combine a model portfolio (MP) rebalance and goal plan (GP) as sub-actions.

Expected utility or return of an action-state (a,s) may be defined by structured composition of sub-utility—or if expressed as negative utility, "sub-cost"—functions. This provides a general framework for specifying the utility or cost of various sub-actions and sub-states as they relate to different expected returns and risks. As a specific example, overall expected return may be defined as:

$$E[R]=E[GS]-\text{SubStrategyRiskSensitivity(SSRS)}-\text{Global Risk Sensitivity(GRS)}$$

The combined expected value of each sub-goal strategy policy may be defined as:

$$E[GS]=[b_{GS1}*E[GS_1]+\ldots+b_{GSN}*E[GS_N]]$$

where:

$b_{GSi}$=a priority weight bias for a given goal strategy; where $\Sigma_i\, b_{GSi}=1$; if the client will not triage a particular goal then $b_{GSi}=1/n$.

$E[GS_1]$=the expected value of the Goal Strategy (GS) given the portfolio risk/return assumptions in $R_p$ and the behavioural risk $\gamma_i$ to the clients discipline in implementing policy $\pi_i$ $GS_i$=a Goal Strategy that includes:
$\pi_i$=a policy that maps [s, a] to s and a=[GP, MP]
Where:
GP=choices to push/pull capital to/from a sub portfolio
MP=choices to rebalance to a new sub-model portfolio
and:
s=[$s_{CF}$, $s_{BS}$, $s_F$, $s_G$] the state of a client's finances and behaviours
Such that:
$s_{CF}$=factors that represent a client's cash flows
$s_{BS}$=factors that represent a client's balance sheet
$s_F$=factors that represent a client's demographic facts
$s_G$=factors that represent a client's stated goals
$\gamma_i$=a discount variable on a client's ability to adhere to in. Or the average percentage of the money they contribute to a particular capital plan on a periodic basis.
$R_{pi}$=a portfolio—a way of allocating capital—that produces an expected return/risk with Markowitz methodologies being an acceptable model. In some embodiments, frameworks provided by Grinold & Kahn methodologies may be used, which enable the decomposition of portfolio risk into different factors.

If any of the client's state factors s change in such a way as to alter the viability of the strategy (Q*), an opportunity for coaching or advice may arise. Coaching may be "a gentle nudge" which helps the client adhere to an agreed upon strategy. Advice may be a change of strategy, asset allocation or plan initiated automatically, or with the discretion of supervision of the advisor.

As described herein, a behavioral part of a wealth policy (capital plan and discipline) is outlined in RL/Q-learning terms, while the portfolio management policy is bracketed to independent science in $R_{pi}$. In some embodiments, $R_{pi}$ is an expected return for a chosen model portfolio, as well as risk factors that are experienced by the client as a penalty. In this same way, $\gamma_i$ may discount only the behavioral component of the forecasted return, during contributions. The discount for the portfolio returns is included in the MPT treatment.

In some embodiments, every quarter or month, capital may be committed to a portfolio by GP, and rebalance the portfolio to a chosen model MP. Return of the portfolio may be simulated based on a risk/return model, and ability to commit capital for each period a number of ways:

choosing a normally distributed random portfolio each period to determine expected returns and extrapolate expected values on the capital base, or run a Monte Carlo simulation based on the past distribution of asset prices, and client behavior, run a Markov Chain Monte Carlo simulation for both asset prices and client behaviour also combining G&K methodologies.

Regional (where the client lives) and occupational (what economic factors impact the clients employment cash flows) risk factors may be incorporated into methodologies for construction of a portfolio.

In some embodiments, this may be modeled by choosing a pre-fabricated model based on a simple control driven by demographic factors. such as: "ClientLivesIn=City", "ClientWorksIn=Oil+Gas" IF, THEN, ELSE→Model.

Expected utility may be penalized by subtracting the sum of sub-strategy volatilities scaled by the client's risk sensitivity:

$$SSRS=[b_{\sigma1}*\sigma_{GS1}+\ldots+b_{\sigma N}*\sigma_{GSN}]$$

Where:
$b_{\sigma i}$=the clients sensitivity to market volatility for a sub-goal portfolio
$\sigma_{GSi}$=the volatility/risk of a sub-goal portfolio
As well as the clients global risk sensitivity to total net worth drawdowns:

$$GRS=[b_{GlobalDD}*VaR_{GlobalDD}]$$

Where:
$b_{GlobalDD}$=the clients intolerance to drawdowns equal to $VaR_{Global}$ A perfectly rational person may have b*=0 and therefore GRS=0, and SSRS=0 because they would understand the rational assumptions governing E[GS]. Namely that investments go up and down, therefore an individual's net worth go up and down, and that investors are rewarded with return over the long run for holding well diversified risk. However, some people are neither familiar with the usefulness of Modern Portfolio Theory, nor able to tolerate MPT expected volatility during period of volatility.

As people are emotional and therefore may have different biases towards the risk in a sub strategy—i.e., the retirement portfolio may be "touchier" then the grand child's education fund, and non-linear "pain thresholds" for maximum drawdown on net worth that have negative health and mortality ramifications (for example, stock volatility may be a risk factor for coronary heart disease death). In another example, some individuals may privilege staying in a home versus liquidating it to maximize expected return.

As such, a client's physical and psychological distress under drawdowns may be "priced" into our utility model. Other penalty or constraint factors may be added as well, that might be contingent on other risk sensitivities, time window penalties and non-linear "all or nothing" discounts for unachieved goals.

Thus, given the facts of money and behavior [s, b] a person's expected returns E[GS] may be optimized by taking into account local $b_a$ and global $b_{GlobalDD}$ risk preferences. A client's behavioral capacity to achieve a capital plan and discount contributions are also factored in by discounting discipline $\gamma$ on a plan.

Clients may provide their advisor with a plurality of goals. Each of the goals may have a risk profile (appetite) associated with it, i.e. clients may accept a higher risk for some goals and not for others. Reinforcement learning may be used to determine life facts of the client. The life facts may be used by an advisor to adjust the risk appetite for a certain goal the client has. Thus, an advisor may be able to determine a risk profile for a client's portfolio solely based on life facts without necessarily receiving a risk profile furnished by the client. In this way, systems and methods disclosed herein may facilitate matching the client goal to the correct strategy and thus may account for clients that overestimate their risk appetite. For example, it is well-known that certain stock market investors overestimate their risk appetite and undergo trauma or even fatal health conditions (such as cardiac arrest) when portfolio value fluctuates or shows volatility characteristic of certain high risk assets. Thus systems and methods herein may facilitate dynamic adjustment of risk profile of clients based on detected and predicted life facts, wherein the detection and prediction is based on reinforcement learning using large-scale granular data sets of clients transactions, demographic CRM data, banking data, behavioural insights (such as that based on website traffic), questionnaires provided to clients, or other data. Such data sets are necessarily massive and gleaning insights from these data sets is impossible using pen-and-paper, or any other manual technique. As such systems and methods disclosed herein described using data processors, non-transitory machine readable memory, and instructions stored on the memory and configured to cause the data processors to process the data according to the reinforcement learning algorithms disclosed herein.

In some embodiments, the reinforcement learning algorithms may be run on cloud infrastructure in communication with a plurality of advisors and providing for a two-way flow between them (see FIG. 7).

A reinforcement learning-based observation model may learn the behaviour of the advisor. A reinforcement model may also learn detection attenuations based on feedback from the advisor. An additional reinforcement model may be used to correlate advisors actions to end results such as client stay or leaving, client changing strategies to invest more, or other results that indicate positive, negative, or neutral outcomes. The additional reinforcement model may be used as a business intelligence tool to determine what actions are beneficial to clients and to the business.

Reinforcement learning as described herein may rely on system identification to build a model of a system from observations.

In some embodiments, reinforcement learning described herein may be formulated as a Markov decision process (MDP).

Figure 15:
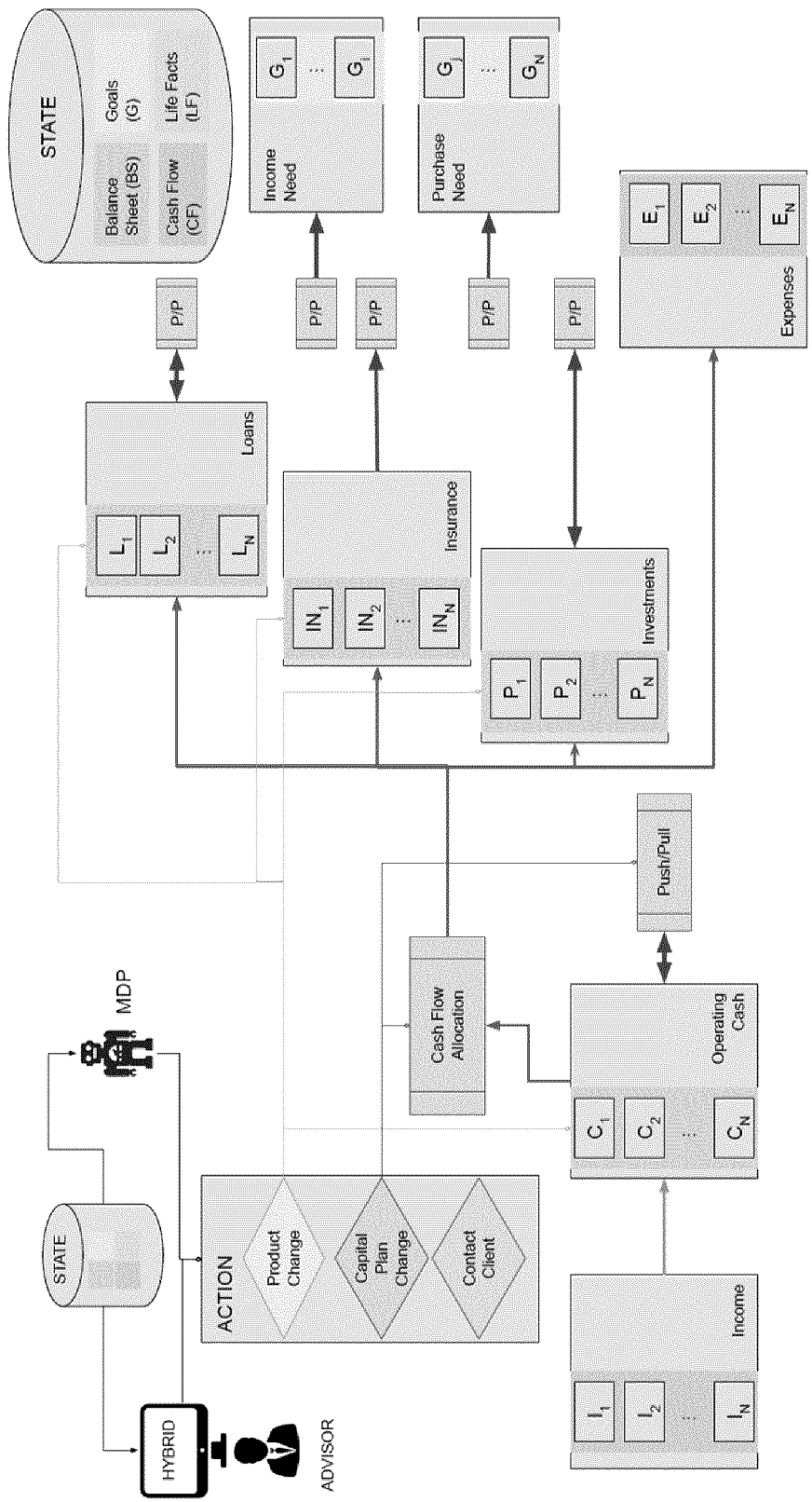
FIG. 15 shows a Markov decision process (MDP) representation of a control system according to one embodiment.

FIG. 15 shows, in an embodiment, a Markov decision process (MDP) representation of a control system that a wealth advisor has on a clients financial strategy for a given period (week, month, quarter etc.). For a given period an amount of cashflow income will have arrived in the clients operating cash accounts. A capital plan will be in place that can allocate cash from the operating cash buffer into financial products like investments, loans and insurance, or the clients expenses. The decision to make a one time push or pull to/from a financial product or towards a one time goal purchase (a house), or goal recurring cash need (retirement annuity stream) is also possible. In short the action space for the advisor is changing the ongoing allocation of cash flow to financial and actual needs or making transfers between different buffers and products. The advisor can also make a non-financial move like contacting a client to gather information, or attempt to impact behavior.

In making decisions for a given period the advisor can look at the clients state, which consists of balance sheet position, cash flow behavior as transactions or flows, life facts about the client, or goals which are essentially a forward plan to do a push/pull buffer action, or commit capital to a recurring need at some predetermined t+k period in the future. The wealth management system may capture state and action for every period, and from these, reward and penalty metrics can be calculated, as well as state transition probabilities based on actions. This enables the modeling of a computer controlled Markov decision process that could learn to optimally "play the wealth advisor game" by learning from historical advisor actions and client data.

State $S=[BS_1 \ldots BS_N, CF_1 \ldots CF_N, LF_1 \ldots LF_N, G_1 \ldots G_N]$ BS=Balance Sheet
Financial Position of products, assets and liabilities such as:
Investments and Savings (P),
Credit Mortgage and Loans (L),
Cash Accounts (C),
Insurance (IN)
  CF=Cash Flows
Incomes (I) and Expenses (E) broken down by category
  LF=Life Facts
Life facts may include demographic details such as age, family status, employment status, etc. Life facts may also include sentiment indicators from derived from NLP processing of emails, sms or voice phone calls with the advisor.
  G=Goals
Recurring income need, or one time lump sum cash need for Retirement, Education, House purchase etc.
Actions
  A vector:

$A=[Prod_1 \ldots Prod_N, CP_1 \ldots CP_N, PP_1 \ldots PP_N]$

Product=Add/Remove/Change a Product/Portfolio
Capital Plan (CP)=recurring cash push/pull to/from product or expense stream
Trivial CP=Push/Pull (PP)=Add/Remove one-time cash to/from Product
Reward
Did client achieve a goal? (High Reward)
Did client abandon service? (High Penalty)
Did client fail to meet financial obligations? (High Penalty)
Did client need to redeem allocated capital to meet financial obligations (High Penalty)

Is client closer to stated goals?

Has client reported positive/negative NPS?

Where clients risk biases violated in terms of expected max drawdown?

Did client report negative sentiment during phone call or chat?

Advisors are intelligent input-output machines. They take as inputs client behavior and profile, balance sheet, and financial history. They implement an investment policy yielding specific actions for the client.

In some embodiments, systems described herein may learn, based on observations of advisor inputs and outputs, optimal or sub-optimal (but provably good) control policies governing these outputs. In the engineering literature this falls under Control Theory and System Identification:

Dimitri Bertsekas: Dynamic Programming and Optimal Control

Lennart Ljung: System Identification

The first covers how to choose optimal policies (that yield optimal actions for the current state) given input-output dynamics. The second describes how to estimated models of input-output dynamics from data.

In general, multivariate state inputs x are observed by the advisor and turned into multivariate actions u by a control policy function h that we would like to approximate. This is part of a larger, 3 part system including:

(1) A state evolution for the client with time index t (state is assets/desires/demographic etc):

$$x\_t+1 = f(x\_t, u\_t, w\_t), t=0,1,\ldots,T$$

(2) An stage-wise cost/utility function we define (i.e., wealth generated/lost, client satisfaction, non-linear events: achieving goal, failing to pay obligations, client lost):

$$c\_t = g\_t(x\_t, u\_t, w\_t) \text{ such that total cost over time is the sum over } t \text{ of } c\_t$$

(3) A control policy:

$$u\_t = h(x\_t)$$

where h is the advisor, giving a control action u_t given current client/world state x_t.

The goal is to optimize (2) by changing (3) both subject to (1). This is commonly solved with various constraints on u_t (i.e. positivity, not too fast, not too large, etc.).

An approximation of h may be learned by fitting a sufficiently flexible, parametric model to observed data on x_t and u_t. Similarly, we can fit a model of the client state update function f on available data. This is done applying methods from "system identification" (the Ljung reference above is classic), which learns function between inputs and outputs by fitting a model to data. There are many ways to do this, the simplest being regression, and more contemporary examples using Deep Neural Networks (DNNs) and Recurrent Neural Networks (RNNs). The cost/utility function is structured by us based on what the bank and advisors want.

An estimate of h can be arrived at by (1) first principles (i.e. not using data, or just using it to tune a few parameters in a model; "white box"), (2) purely data driven (i.e. learning an estimate of h just using the data and a flexible model like DNNs; "black box"), or (3) using both domain knowledge combined with a data-driven approach ("grey box"). We would likely use (3).

Having a good estimate of f and h based on data from a number of advisors may:

(1) Provide rapid advice on best actions u_t to advisors based on our learned h(x_t) for the current time t.

(2) Assess individual advisor performance based on optimal performance. Given optimal h*, i.e., is the investor's close to the optimal policy for the observed system f and costs g?

(3) Understand the client time evolution allowing for better prediction of coming events, and better categorization into "personalities'

Note assuming everything is linear, Gaussian results in the very classic control problem for linear dynamical systems:

$$y\_t = Ax\_t + Bu\_t + e$$

Where A and B are matrices. This assumption is the basis of various interpretations, although most applications assume nonlinear, non-Gaussian dynamics and perturbations.

Industrial and Organization Concerns in Determining Q*

Q* may be optimized based on facts about a client's financial position and behavioral biases. From there wealth management system 300 may provide correct ongoing up-to-date delivery of Q*.

Existing advisors (RMs) can service hundreds of clients placing a heavy cognitive and operational demand on a single point of failure. In the future, cost constraints might make this number thousands. On a given day, we should hope that an advisor is helping the client with advice that leads to the greatest defense or increase in wealth on a forward basis. The issue at hand is information overload, broken communication, cognitive fatigue and dropped signals. As a result, advisor-client relationship trust may breakdown due to clients losing trust as the result of a failure to return calls promptly, failure to understand the client's goals and objectives, and failure to communicate with the client.

Conveniently, wealth management systems as described herein may allow RMs to focus on and provide the right advice for the right client at the right time, and as a result, grow revenue, increase loyalty and reduce risk. By helping a client with the most to gain/lose on a given day, an organization may gain/defend the most revenue on a given day.

Wealth management systems as described herein may allow for an understanding of clients in real time and the ability to provide leadership. Improving revenue returns may increase the relationship, grow wealth and enhance loyalty. Managing risk or protection activities may mitigate redemption, allow for strategy adjustment and defend loyalty.

Wealth management systems as described herein may address three questions:

(1) WHO is the client? aka Financial Persona (facts, goals, behaviours). Determine whether the client belongs to a segment, archetype or demographic.

(2) WHEN is a moment chosen to adapt Q*? aka Moments that Matter (what has changed or happened). Detect events that impact delivery or status of a client's wealth strategy.

(3) WHAT is the best course of action to optimize a client's wealth in service of their goals? aka Goals, Plans and Strategies. Manage risk and behaviour for the desired outcome.

Wealth management systems as described herein may provide structure for continual research and experimentation that leads to effective actions with the information available.

Wealth management systems as described herein may apply models from animal behavior sciences to data on human finance behavior in determining a wealth policy Q*.

User Interaction with Wealth Management System

Returning to FIG. 2, the flow of information between wealth management agents and the mechanisms for making determinations will now be described.

In some embodiments, Q* may start being solved by employing an advisor, such as portfolio user 202, to determine a suboptimal but worthwhile strategy $Q^{ADVISOR}$ for a client, such as client user 201, based on information at hand, as well as a prompt that something meaningful has changed in the client's myriad data.

FIG. 2 illustrates a framework for optimizing judgement and action. Insights and Actions flow downward from Researcher (data user 203) to Advisor (portfolio user 202) and Client (client user 201), and Feedback back up from Advisor and Client to Researcher. The goal of both flows is to improve Q*.

Data User

As a data user 203 may be concerned with financial personalities, events and causality, and analysis may be performed on the population with research studio 320, and if desired, through proprietary machine learning craft enabled by API and patterns module 326.

In some embodiments, data user 203 is able to segment clients by fact, or by behavior, into groups of interest. In some embodiments, data user 203 is able to determine event filters (either ex post, or a priori through prediction) that are of interest from an advice or coaching perspective. These are surfaced to portfolio user 202 as Next Best Action or to client user 201 as Coaching.

In an example, for the set of all client data: $s=[s_{CF}, s_{BS}, s_F, s_G]$ for each member of the population, data user 203 can partition the population into categorical sets, create composite features based on client state, or detect events that might be useful to portfolio user 202.

A data user 203, such as a research engineer, can access API 308 or the SYMBIOSIS 1100 segmentation and event detection pipelines to build custom learning craft, or intelligence pipelines.

Portfolio User

A portfolio user 202, such as an advisor, may be concerned with managing and advising client strategies and accounts, and receives guidance from wealth management system 200 in the form of Next Best Actions and in a dashboard of enterprise application 304 in order to guide decision making and operations Client telemetry may provide evidence which supports the next best action. For a simple event, this might be a timeseries chart of the threshold univariate value. For a predictive model, this might be the most important input features, OR a curated list of timseries that the researcher felt were relevant to the advisor. Portfolio user 202 can rate or provide feedback on the usefulness of the Next Best Actions coming from wealth management system 200.

Client User

A client user 201 may be concerned with understanding their own financial situation, and receiving advice or insights that assist in achieving the strategy in the form of Coaching and Insights from wealth management system 200, and Advice and questions from portfolio user 202 through client application 302.

Flow of Advisor-Machine Insights

In some embodiments, event detection, and surfacing of client state to advisors is used towards constructing a learning model for wealth management.

Event detection in client state may achieve two milestones: 1) A Next Best Action iterative improvement loop (A functioning auditable flow of insights from data to advisor and client back with an insight feedback mechanism); and 2) The construction of models which formally encode the decision making process of the advisor based on a well understood inputs and outputs.

A flow of data through model learning to advisor judgment is illustrated in FIG. 7.

EREBOS—Data Protection Module

In order for Symbiosis 1100 to perform analytics outside of the client perimeter under a SaaS framework, client data may be anonymized, de-identified and privatised under certain regulatory regimes (GDPR). EREBOS data protection module 1200 is a data obfuscator and privatizer that enables offsite analytics to be performed safely.

Figure 14:
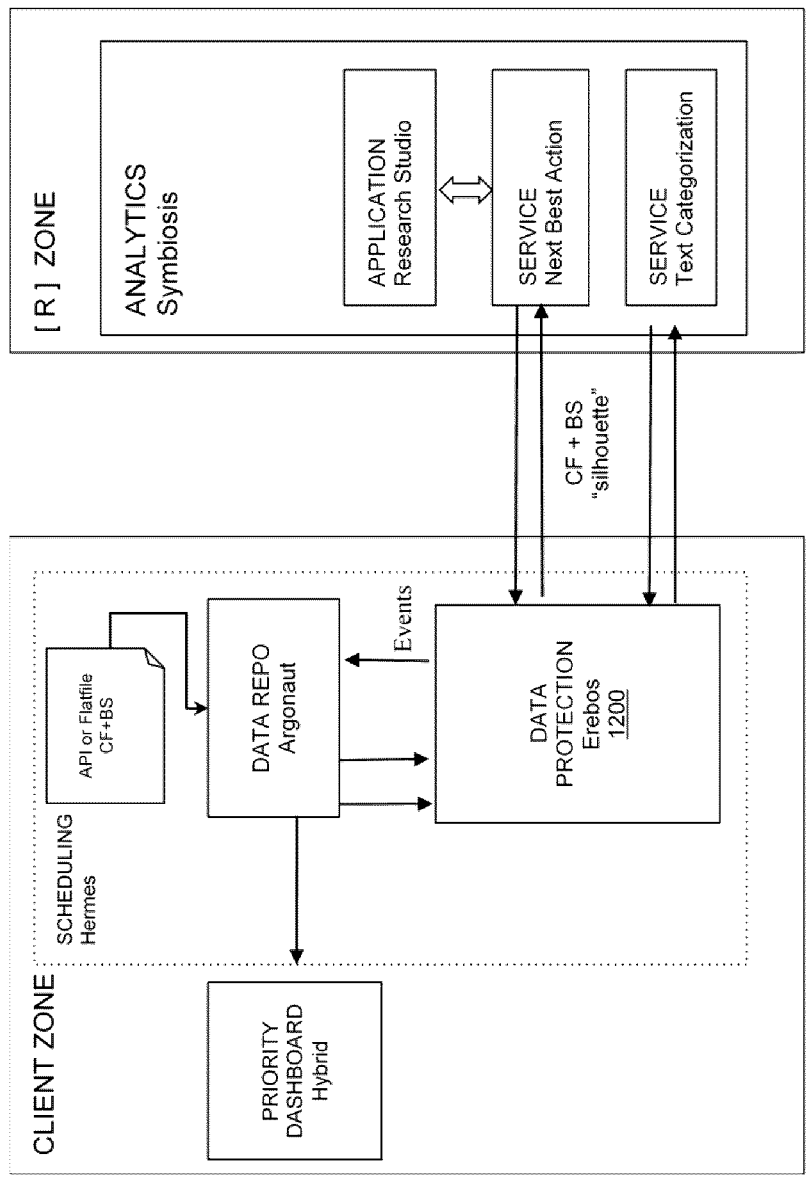
FIG. 14 illustrates communication with a data protection module according to one embodiment.

FIG. 14 illustrates an overview of zones and transit in communication with data protection module 1200.

A round trip of data may start from the Enterprise Client EDW, an enterprise client's data warehouse or data lake that interfaces with wealth management systems described herein, and ending with the HYBRID Next Best Action advisor dashboard, or priority dashboard as illustrated in FIG. 14.

Data protection module 1200 may address:

what data is used to teach the system, how that data is pseudonymized (algorithms etc), and what is the lifetime of the data how to get consent of the data subjects what data is needed in pilot/production how the data is pseudonymized how the contract/consent is managed The enterprise client, such as enterprise application 304, will typically manage consent through existing client service channels (web, mobile, email) and regulatory models.

The Enterprise Client consent process can daylight which data is being used in processing and for what purpose. Consenters will be whitelisted. Non-consenters or withdrawers will be removed from the white-list. Enterprise Client should only export CSV data for the white-list. Responsive will rely on the fact that exported data is white-listed. If a user is not whitelisted, they should be forgotten.

The data processed by Responsive has two frequencies of concern: 1) modelling+training and 2) event detection.

Modelling and training would require a historical data dump to be processed for training on a monthly or quarterly basis. No PII data or even silhouetted data would be preserved in the model, but under a very strict interpretation of "right to forget" in which a trained AI model retains "residual" memory of a user, it would be possible to purge the model of "residue" from withdrawers at the monthly or quarterly cadence.

In some embodiments, event detection data could purged immediately after processing.

In short, EDW controls via whitelist which data is processed. Short term data is purged regularly, and model data according to a TBD policy (monthly to quarterly).

In some embodiments, RSA encryption may be used.

In some embodiments, 1) Sent: Non-PII Transaction Name text, Received: Hashed Enums; 2) Sent: Anonymized CF+BS Silhouettes, Received: Next Best Action Events.

Examples of privacy workflows will now be described below.

Privacy Workflow Example 1—Exports Flat Files for Cash Flow+Balance Sheet (CF+BS)

The Client EDW exports nightly CSV flat files which contain client cash flow and balance sheet information through transactions, account balances, and investment holdings.

The data could come from the following accounts on a transactions or positions basis:
Checking
Savings
Credit
Investments
Loans
Mortgages Privacy Workflow Example 2—Scheduler & Loader In some embodiments, integration engine 306 schedules and assists with file handling and API connectivity between customer and Responsive systems. It ensures transit between systems as well as exception handling and logging.

Privacy Workflow Example 3—Data Collation, Normalization and Repo

In some embodiments, data engine 310 is a data repository that collates and normalizes client CF+BS data for usage in Hybrid Advisor apps, and Symbiosis analytics. The normalized data is then accessible through API to apps and processes in the secure customer zone.

Privacy Workflow Example 4—Private Categorization of CF+BS

Wealth management system 300 uses a proprietary set of categories to perform analytics. The categories may be stored as numerical enumerations on the Enterprise Client side.

This may enable CF+BS data to be sent across wire using opaque enumerations.

For example:

- A transaction "name" or "description" might be → "McDonalds"
- Which would be mapped to Responsive category → "cf.food.fastfood"
- Which might be stored in the EDW system as → "f9660feccde4"

Thus, every unique transaction name or description (without any PII) may be sent to wealth management system 300 cloud encrypted and salted for categorization.

In an example, the roundtrip exchange looks like:

```
OUTBOUND
    Argonaut
        →"McDonalds"
            →Erebos
                →Salted_Encrypted("McDonalds")
                    →[ R ] Zone
INBOUND
    [ R ] Zone
        →Salted_Encrypted("f9660feccde4")
            →Erebus
                →"f9660feccde4"
                    →Argonaut
```

Thus, no personally identifiable data may be exchanged in this process.

Privacy Workflow Example 5—Creating the CF+BS Data Silhouette

The goal of the silhouette process is to create an anonymous and de-identified data image of a client that suppresses, sums, and quantizes away granular information that would allow for identification or singling out, while still preserving information structure that is useful in a machine decision process.

De-Identification

Suppose an OP transaction loosely matches the pattern:

```
{
    op_user_id:          "12345678910"
    identfiable_string:  "Mr. Identifiable Person"
    name:                "McDonalds"
    amount:              "7.30"
    ...
}
```

Data protection module 1200 will salt and hash the op_user_id:
12345678910→7c4808a8-5fcb-453e-ac16-020be5103caa Data protection module 1200 will suppress any identifiable (Safe Harbor) strings:
"Mr. Identifiable Person"→"*"

As described above, the name/message of the transaction will be privately categorized:
"McDonalds"→"f9660feccde4"

The amount/value is dealt with in the next sections.

Time and Category Roll Up

Transaction names are mapped from many discrete names (thousands), to a finite few wealth management system 300 categories (dozens). This is the first level of roll up.

The second level of roll up is taking all discrete transactions in a given week for a category, and summing them.

For example, if in a given week someone goes to "McDonalds" twice, "McDonalds" three times, and "Burger King" once, all of these get summed up into one number with the category "f9660feccde4". The information about the specific vendor is destroyed, as are the unique values of the transaction amounts.

At this stage, the data is for the purposes of GDPR de-identified and anonymous, but there is still a marginal risk of being able to "single out" a user from compromised data. The next section deals with the strategy for k-anonymizing users.

Thus, there is no way to infer distinct transactions at distinct locations and distinct times from this data.

K-Anonymized Quantization

For a given week, for a given user, a list of sum spends (or incomes, or balance sheet positions) may be known.

In a toy case, for a given week, this may look like:
A= €300
B= €650
C= €20
Total= €970

The category values may then be expressed for the week in percentage terms, using the denominator of €970:
A=31%
B=67%
C=2%
Total: €970

This may be referred to as the client's "spending" portfolio, which looks quite similar to an actual portfolio of client positions.

A small amount of information may be destroyed by rounding the sum value to the nearest €50 euro (or some interval which gives us a level of comfort around k number of individuals who spend, or make X per week)

A=31%
B=67%
C=2%

Total: €970→ €950

At the same time, it is possible to take the rolling covariance or correlation of categories which produces a unitized relative set of values, which even for the purposes of private medical data, are considered sufficiently anonymous.

Thus, the silhouette package may provide:
A hashed unique ID for the "weekly" package:
"7c4808a8-5fcb-453e-ac16-020be5103caa"
A quantized portfolio for each: spend, incomes, assets, and liabilities, expressed in percentage, with hashed enums for the category

```
{
    "f9660feccde4": 4%,
    ...
    "52ede33cd597": 12%,
}
```

Correlation and covariance vectors with unitized values may be used, similar in structure to above.

Privacy Workflow Example 6—Next Best Action "Events"

Symbiosis 1100 will process the CF+BS Client Silhouette described above to determine if a particular event has happened, or is likely to happen in the future.

If a determination is made, an event will be sent back encrypted across the wire to data protection module 1200 with the following format

```
{
    event_message:    "A message about the event"
    priority:         "high"
    evidence:         [ "f9660feccde4", "52ede33cd597"]
}
```

"Evidence" is a list of category hashes, that will be mapped back to human readable categories to by data protection module 1200 to support decision making in the Priority dashboard.

Privacy Workflow Example 7—the Erebos Codex
1. Embodiments describe may avoid sending human readable labels associated with cash flow or balance sheet across the wire. Data protection module 1200 may "cover" these category labels on the way out, and to re-join them to human readable labels on the way back in. In this way, data protection module 1200 takes the evidence categories from the Next Best Action event, and re-maps those back to human readable categories that can be pulled from the data engine 310.

Privacy Workflow Example 8—Pulling Human Readable Evidence

After data protection module 1200 has mapped the hashed evidence categories to human readable categories, they can be sourced from data engine 310, and provided to the Priority Dashboard at enterprise application 304.

Figure 18:
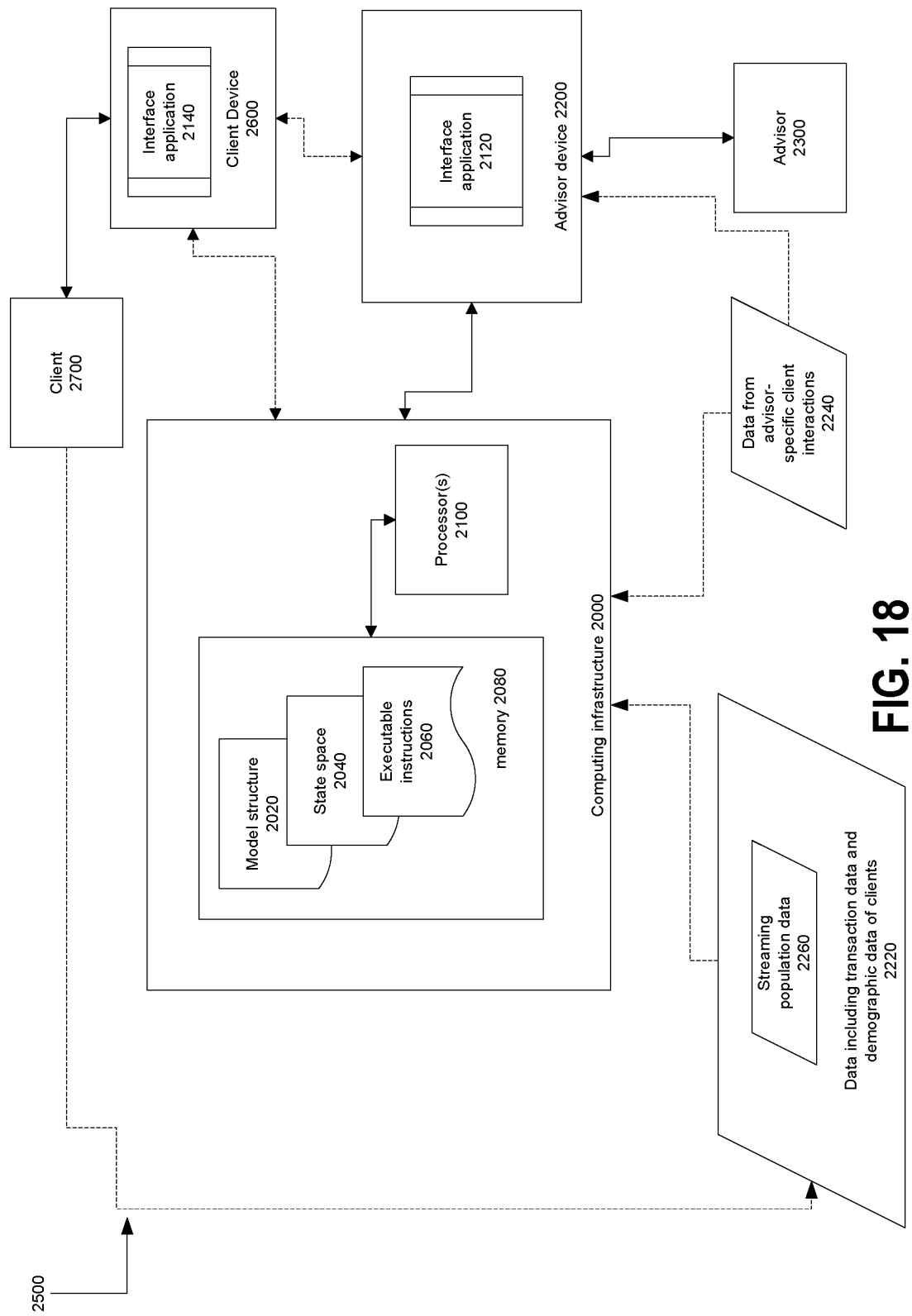
FIG. 18 is a schematic for a system transmitting alert notifications to devices for decision making support, according to aspects of the present disclosure.

FIG. 18 shows a schematic for a system 2500 transmitting alert notifications to devices for decision making support, according to aspects of the present disclosure. The system 2500 comprises memory 2080, which is machine-readable and at least partially non-transitory, storing a model structure 2020 and state space 2040, the state space 2040 defined by variables measuring population goals and user behaviour, the model being a parameterized, normalized, and rational client-centric model. The system 2500 further comprises a processor 2100 coupled to the memory 2080 programmed with executable instructions 2060, the instructions configuring the processor 2100 with: event rules conditional on client profile data and prediction data generated using the model structure, an event detector to detect an event using the event rules and streaming population data 2260, and an alert engine to compute next best action data based on the event and model state, the next best action data having evidence supporting the event. The system 2500 further comprises a device 2200 having the interface application 2120 for displaying the next best action data and collecting feedback data for the next best action data, the feedback data linked to an operational context, and received from an advisor 2300. The processor 2100 updates the event rules and next best action data based on the feedback data. The alert engine may be based on data 2220 of clients, including transaction and demographic data, and data 2240, including client data retrieved by advisor 2300 and based on advisors interaction with the client.

In some embodiments, corresponding to Advisor Device (2200, 2240, 2300) are congruent Client (Luna) and Researcher (Nuit) in the form of interface applications running on end user device(s) where for Client the data is "client usage data" and for Researcher the data is "model, feature and next best action configurations and parameters". In some embodiments, corresponding to Advisor Device (2200, 2240, 2300) are congruent Researcher (Nuit) components in the form of interface application 2120 running on end user device(s). In some embodiments, Client Device (2600) may be congruent to Client (Luna) application in the form of interface application 2140 running on an end user device. In various embodiments, client device 2600 may communicate with advisor device 2220 and send data, or it may communicate directly with the computing infrastructure 2000. In some embodiments, client 2700 may provide data directly to the computing infrastructure 2000 in addition to interacting with the client device 2600. In some embodiments, the processor 2100 uses the state space 2040 to generate the prediction data using the model structure 2020 to infer client stage of life, a behavioral profile, client financial strategy for the stage of life and the behavioral profile, tactile adjustments to the behavioral profile or financial profile to support the client financial strategy, and a notification message for a client interface indicating at least a portion of the tactile adjustments.

In some embodiments, the processor 2100 generates the client profile data and the prediction data using categorized, normalized, enriched or enhanced features extracted from the streaming population data 2260.

In some embodiments, the streaming population 2260 data comprises financial transaction data, balance sheet data, credit data, mortgage data, investment data, stage of life data, responses to questionnaires, demographic data, or goal data.

In some embodiments, the feedback data comprises data indicating the relevance or utility of the next best action data.

In some embodiments, the feedback data comprises data indicating activation of a detail view of the next best action data, contact of client on the next best action data, operations on client account or portfolio based on the next best action data, fund transfers, service requests.

In some embodiments, the processor 2100 adjusts event rules based on feedback data to adjust a hyperplane separating events from non-events.

In some embodiments, an event rule comprises a threshold function on one or more data features in the state space. In some embodiments, an event rule comprises a confidence threshold on a predicted future event in the model structure. In some embodiments, an event rule comprises a confidence threshold on a hidden or unobserved variable.

In some embodiments, the processor 2100 configures an alert engine to compute the next best action data using a hyperplane threshold on the state space to detect a set of state features. In some embodiments, the processor 2100 configures the alert engine to compute the next best action data using a supervised learning system to predict if a past state of the state space is indicative of a future event based on indicator variables. In some embodiments, the processor 2100 updates the event rules and next best action data based on the feedback data by adjusting a confidence threshold or hyperplane separation threshold to minimize error and maximize relevance or utility of the next best action data.

In some embodiments, the next best action data is predictive and the feedback data is indicative of a relevance variable for the next best action data.

In some embodiments, the processor 2100 updates the event rules and next best action data based on the feedback data by adjusting a priority or rank of the next best action data in terms of advisor relevance, wherein the feedback data is indicative of the advisor relevance.

In some embodiments, the interface tools of interface application 2120 configure feature selection using a list of candidate features for the model structure and selection of hyperparameters of the model structure.

In some embodiments, the event detector is a hyperplane based event detector and the interface tools configure the event detector using a list of features and a hyperplane separator. In some embodiments, the interface tools configure an event predictor using a list of features, a dependent event indicator feature, a window size, forward period prediction length, and a supervised learning method. In some embodiments, the interface tools configure a hidden state or label predictor using a list of features, a dependent event indicator feature, a window size, and a categorization method.

In some embodiments, the interface tools of interface application 2120 display a list of model structures for selection and the model structure is a selected model structure from the list of model structures. In some embodiments, the interface tools of interface application 2120 display model performance data for the model structures along with learning parameters and model metrics.

In some embodiments, the interface tools of interface application 2120 select a clustering process on a list of features and configure a hyperplane detector to generate a signal for a event that a user has moved from a behavioral cluster to another behavioral cluster.

In some embodiments, the feedback data is used to adjust a rank or priority of the next best action data.

In some embodiments, the processor 2100 configures a next best action pipeline for an event label, the pipeline configures the event label to use and supporting data, an advisor message, broadcast scope for the next best action, and a process for the next best action.

In some embodiments, the ontology indicates states that are fully observable, partially observable, hidden, or expired that are useful for determining the next best action data. In some embodiments, the ontology indicates a financial persona for selecting the next best action data and wherein the processor tunes relevance of the next best action to the ontology.

In some embodiments, the binary univariate thresholding function for features determines a level of saliency or significance in triggering the event detection and the next best action data.

In some embodiments, the on-line system data represents states of a client life situation and financial situation. In some embodiments, the streaming population data 2260 represents just in time data that impacts beliefs in an ontology for the selection of the next best action data.

In some embodiments, the feedback data rates the relevance of the next best action data for display at the interface dashboard or a threshold for a hyperplane which separates an event and a non-event.

A supervised learning system could be used to predict if the past state is indicative of future events based on indicator variables like: Single→Married, Income decreased 40% or more, Client took out a mortgage, client paid off credit card, client inherited 100K or more, or other events.

Data storage of "state", "model", and data processing thereof are done in the cloud due to the storage requirements of big data, the processing advantages of parallelization, and the security and centralization requirements of a system of intelligence. It is not possible process terabytes of data for millions of clients on the edge in a smartphone in a timely fashion, nor would security and privacy requirements make this possible. Anonymization by a data processor(s) in the cloud is necessary.

Nuit, Helios and Luna are web/mobile light interfaces to the API's on the rest of the cloud infrastructure. Nuit, Helios and Luna have a plurality of displays that interface with APIs of the other systems. At a high level Helios, Nuit and Luna reflect notifications, summary lists, and summary visualizations of client ontology, or of client population ontology. As well through Helios advisors can actionate account and strategy changes, to be effected by the cloud infrastructure. Researchers and governors can configure/parameterize next best actions in Nuit to be run/optimized/processed on the cloud infrastructure. In general configuration of the Research Studio, and summary reports of Research Studio are done on an end user device Nuit, while heavy computation is done in Hermit.

In general, each aspect of the system communicates by API requests over TCP/IP connections.

The state space impacts the model for computing the Next Best Action. In some embodiments, the state space is used to infer a model of: what life stage a client is at, the client's behavioral profile, the best strategy for the given client, any tactical adjustments to client finances or behavior to assist in developing the best strategy for the given client, and whether or not contacting the client to gather more information is valuable.

In some embodiments, the streaming population 2260 data includes cash flow (cash and credit transactions), balance sheet (cash, loan, credit, mortgage, investment, life facts (demographic data, questionnaire), and client goals. The client profile and prediction data includes categorized, normalized, enriched or enhanced features deduced from the streaming operational data.

The operational context impacts how the feedback data is received and/or is used to update the rules. For example, whether or not the advisor examines a next best action (e.g. by opening a detail view), whether or not they contact the client, whether or not they operate on the accounts or product portfolio, whether or not money is moved by client or advisor and whether or not the client stays with the service, will impact the relevance or utility of the action, and or adjust the hyperplane separating an event from a non-event.

The model and state space are used to detect events. In some embodiments, an event may be a simple threshold function on one or more data features in the state, or it could be a confidence threshold on a predicted future event in the model, or a confidence threshold on a hidden/unobserved variable like "did the client have a child, get divorced, or lose their job"

The model and state space are used to compute the next best action data. In some embodiments, a simple hyperplane threshold in the state space may be used to detect simple things like changes in income, change in cash balance, etc or any other such logistic detector on a number of state features The rules and Next Best Action data are updated based on the feedback data. In some embodiments, the rules and Next Best Action are updated based on the feedback by one of two ways: (a) a confidence threshold, or hyperplane separation threshold could be adjusted to minimize error per the "Research Studio—Events Pipeline" section above, a classifier using standard art and SMOTE could be used to calibrate relevance (Chawla et al 2002) (did the advisor examine, contact client, or act on accounts), or with respect to money movement, was the next best action predictive, or indicative when the advisor did or did no act. For a given next best action, a specific relevance variable (advisor attention/action, money movement etc) could be used, or a linear blend, (b) the priority or rank of the next best action in terms of advisor relevance, i.e. what they want at the top of their list—could be adjusted using event type, forecasted monetary impact, and other high level indicators (income, life stage, job status etc) as inputs to any standard ranking algorithm.

In some embodiments of the system 2500, the interface application has interface tools to adjust the model structure and constraints on parameters of the model. In some embodiments, users may visually code value added features or logical indicators using arithematic, time based, logical or technical functions on one or more input features (see FIG. 16). In some embodiments, users may visually evaluate and curate lists of features for downstream usage in models. In some embodiments, users may configure a feature selection search using a list of candidate features, candidate transforms and selection hyperparameters. In some embodiments, users may configure a hyperplane based event detector using a list of features and either a logically configured hyperplane separator, or a hyperplane separator detection mechanism. In some embodiments, users may configure an event predictor by using a list of independent features, a dependant event indicator feature, a window size, forward period prediction length, and the preferred supervised learning method (see FIG. 11). In some embodiments, users may configure a hidden state/or label predictor by using a list of independent features, a dependant event indicator or label, a window size and a preferred categorization method. In some embodiments, users may view a list of models, and how they perform out of sample as well as learning parameters and other metrics in a list. In some embodiments, users may choose a clustering methodology on a list of features, and configure a hyperplane detector that will signal the event that a user has moved from one behavioral cluster to another.

In some embodiments of the system 2500, the feedback data rates the next best action as highly relevant, relevant, somewhat relevant or not relevant. In some embodiments, the rank/priority of the Next Best Action will be adjusted. An advisor may provide the feedback, e.g. an advisor may rank or prioritize the Next Best Action.

In some embodiments of the system 2500, the client profile data comprises transaction data, wherein the processor is configured to label the transaction data using categories, wherein the event rules are configured using the categories.

In some embodiments of the system 2500, the processor labels events for the model to compute the next best action data, the labels corresponding to multinomial categories, the feedback data corresponding to the multinomial categories, and updates the event rules and the next back action data using the multinomial categories. In some embodiments, a Next Best Action pipeline may be configured for an event label. The pipeline configures which event label should be used, what supporting data should be supplied as evidence for examination, a human readable message for the advisor, the scope of broadcast for the next best action (beta advisors, which branch, or the entire network), a priority configured manually or by ranking, and/or a journey or process link the advisor should start in their application to further actionate the event.

In some embodiments of the system 2500, the processor determines a financial client persona using the streaming population data and detects the event using the financial client persona.

In some embodiments of the system 2500, the detected event is an ex-post empirical event.

In some embodiments of the system 2500, the detected event is an a priori prediction event.

In some embodiments of the system 2500, the detected event is a periodic event or a quasiperiodic event.

In some embodiments of the system 2500, the processor has a quasiperiodic event rule based on a regular pattern of recurrence with a random component that does not have a precise and deterministic characterization.

In some embodiments of the system 2500, the processor computes summary visualizations of the streaming population data, the summary visualizations corresponding to metrics for the detected event and the model, wherein the interface application displays the summary visualizations.

In some embodiments of the system 2500, the processor uses supervised learning to predict an ontology and configuring the model using the ontology. The ontology represents states that might be fully observable, partially observable, hidden or stale (out of date) that would be useful to determining Next Best Actions or Best Actions towards an optimal wealth strategy such as the client balance sheet, life situation, age, income, behavioral risk profile and goals. An example of a fully observable component of ontology would be a fresh read of the client's checking account balance, an example of a hidden or stale ontology might be the client's marital status, which on a questionnaire given a year ago would be "Single" but in actuality should be "married", but since no questionnaire has been taken since the marriage, the label is out of date. Similarly the system may have limited data for a client, such as only their operating cash account, but might need to infer their age, income or risk profile. Having a set of beliefs around key financial persona ontology enables the system to choose a relevant next best action, or propose changes in strategy by mapping the ontology into a strategy, or tuning the relevance of the Next Best Action to the ontology.

In some embodiments of the system 2500, the processor generates a binary univariate thresholding function for features and configures the event rules using the binary univariate thresholding function. The thresholding function may be used to determine a level of saliency or significance in triggering an event/action that will be sent to the advisor to augment the service or wealth strategy.

In some embodiments of the system 2500, the processor configures the event rules with multivariate pattern detection for periodic data and quasiperiodic data.

In some embodiments of the system 2500, the interface dashboard receives a financial state of a user and a financial goal of the user, wherein the processor determines a discount variable for a plan to achieve the financial goal and the alert engine computes the next best action using the discount variable, the processor dispatches the next best action to the interface dashboard, wherein the discount variable is determined by: modelling past behaviour of the user and other users based at least in part on identifying transaction actions of the user, and identifying periodicity of the transaction actions, and segmenting each of the transaction actions to an archetype and the user to a persona.

Figure 19:
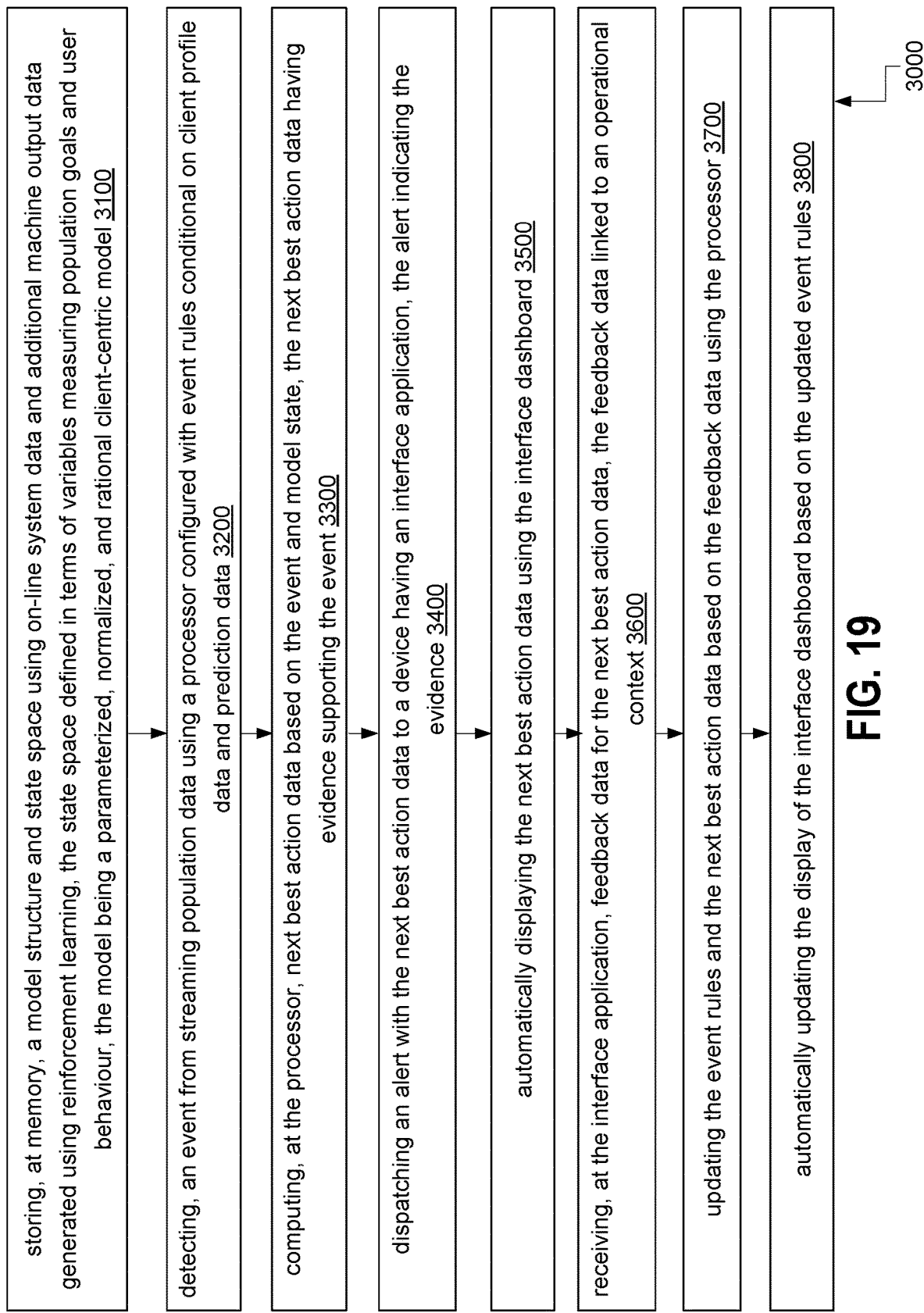
FIG. 19 is a flowchart for a process for alert notifications at an interface dashboard for decision making support.

FIG. 19 is a flowchart for a process 3000 for alert notifications at an interface dashboard for decision making support. The process 3000 includes storing, at memory, a model structure and state space using on-line system data and additional machine output data generated using reinforcement learning, the state space defined in terms of variables measuring population goals and user behaviour, the model being a parameterized, normalized, and rational client-centric model (3100); detecting, an event from streaming population data using a processor configured with event rules conditional on client profile data and prediction data (3200); computing, at the processor, next best action data based on the event and model state, the next best action data having evidence supporting the event (3300); dispatching an alert with the next best action data to a device having an interface application, the alert indicating the evidence (3400); automatically displaying the next best action data using the interface dashboard (3500); receiving, at the interface application, feedback data for the next best action data, the feedback data linked to an operational context (3600); updating the event rules and the next best action data based on the feedback data using the processor (3700); and automatically updating the display of the interface dashboard based on the updated event rules (3800).

The online system data and additional machine output represents the state of the clients life situation, their personal finances and any risks or opportunities that might warrant action or investigation thereof.

The streaming population data represents just in time data which may or may not impact the beliefs of the ontology, which in turn might warrant an advisor action or investigation. Streaming population data might also represent recent material changes to a clients financial position that warrant action or investigation.

The feedback data may attenuate the relevance of the data in a ranking for display to the advisor, or the threshold for a hyperplane which separates an event for a non-event (e.g., it may help determined whether an event such as a client receiving $20,000 in cash in their checking/savings accounts is relevant, or how relevant is it compared to a client receiving $30,000 in cash in their checking/savings account).

In some embodiments of the process 3000, the feedback data rates the Next Best Action as highly relevant, relevant, somewhat relevant or not relevant. The direct advisor feedback (relevant, not relevant), or implicit feedback (examined, unexamined) or (account action, no account action) or (communication initiated, no communication initiated) or (money moved, non money movement) can be used to attenuate either 1) the hyperplane for the event as a categorizer 2) the rank relevance of the Next Best Action (NBA) for the advisors priority dashboard.

As an example, an application of using feedback data to adjust the Next Best Action is suppose a client is over 55 and their income drops by 20%. Should the Next Best Action include changing their investment strategy? Or should this be the Next Best Action when the client is over 55 and the income drops by 18%? Such determinations can be made and decisions finessed using detection attenuation or feedback data provided by an advisor. As another example, which is a higher priority or more important event (life fact): a change in marital status or predicted cash windfall of $50K in the next 2 weeks?

In some embodiments of the process 3000, the on-line system data comprises transaction data, the transaction data labelled using categories, wherein the event rules are configured using the categories.

In some embodiments, the process 3000 further comprises labelling events for the model for the processor to automatically compute the next best action data for dispatch to the interface dashboard, the labels corresponding to multinomial categories, the feedback data corresponding to the multinomial categories, updating the event rules and the next back action data using the multinomial categories.

In some embodiments, the process 3000 further comprises determining a financial client persona using the streaming population data and detecting the event using the financial client persona.

In some embodiments of the process 3000, the detected event is an ex-post empirical event.

In some embodiments of the process 3000, the detected event is an a priori prediction event.

In some embodiments of the process 3000, the detected event is a periodic event or a quasiperiodic event.

In some embodiments, the process 3000 further comprises configuring a quasiperiodic events rule based on a regular pattern of recurrence with a random component that does not have a precise and deterministic characterization.

In some embodiments, the process 3000 further comprises computing summary visualizations of the streaming population data, the summary visualizations corresponding to metrics for the detected event and the model.

In some embodiments, the process 3000 further comprises using supervised learning to predict an ontology and configuring the model using the ontology.

In some embodiments, the process 3000 further comprises generating a binary univariate thresholding function for features for configuring the event rules.

In some embodiments, the process 3000 further comprises configuring event rules using multivariate pattern detection for periodic data and quasiperiodic data.

In some embodiments, the process 3000 further comprises receiving a financial state of a user, receiving a financial goal of the user, determining a discount variable for a plan to achieve the financial goal, determining the next best action using the discount variable, dispatching the next best action to the interface dashboard, wherein the discount variable is determined by: modelling past behaviour of the user and other users based at least in part on identifying transaction actions of the user, and identifying periodicity of the transaction actions, and segmenting each of the transaction actions to an archetype and the user to a persona.

Figure 20:
FIG. 20 shows an example screenshot of an interface dashboard.

FIG. 20 shows an example screenshot of an interface dashboard. The interface application has interface tools to define pipelines. A Next Best Action pipeline can be configured for an event label. For example, the pipeline can configure which event label should be used, what supporting data should be supplied as evidence for examination, a human readable message for the advisor, the scope of broadcast for the next best action (beta advisors, branch a or b, or the entire network), a priority configured manually or by ranking, and/or a journey or process link the advisor should start in their application to further actionate the event. An interface tool can be used to create a new pipeline. The tool can be used to defined different attributes or properties of the pipeline, such as pipeline name, event, action type, priority, message (for the alert notification and display), status, and actions.

Figure 21:
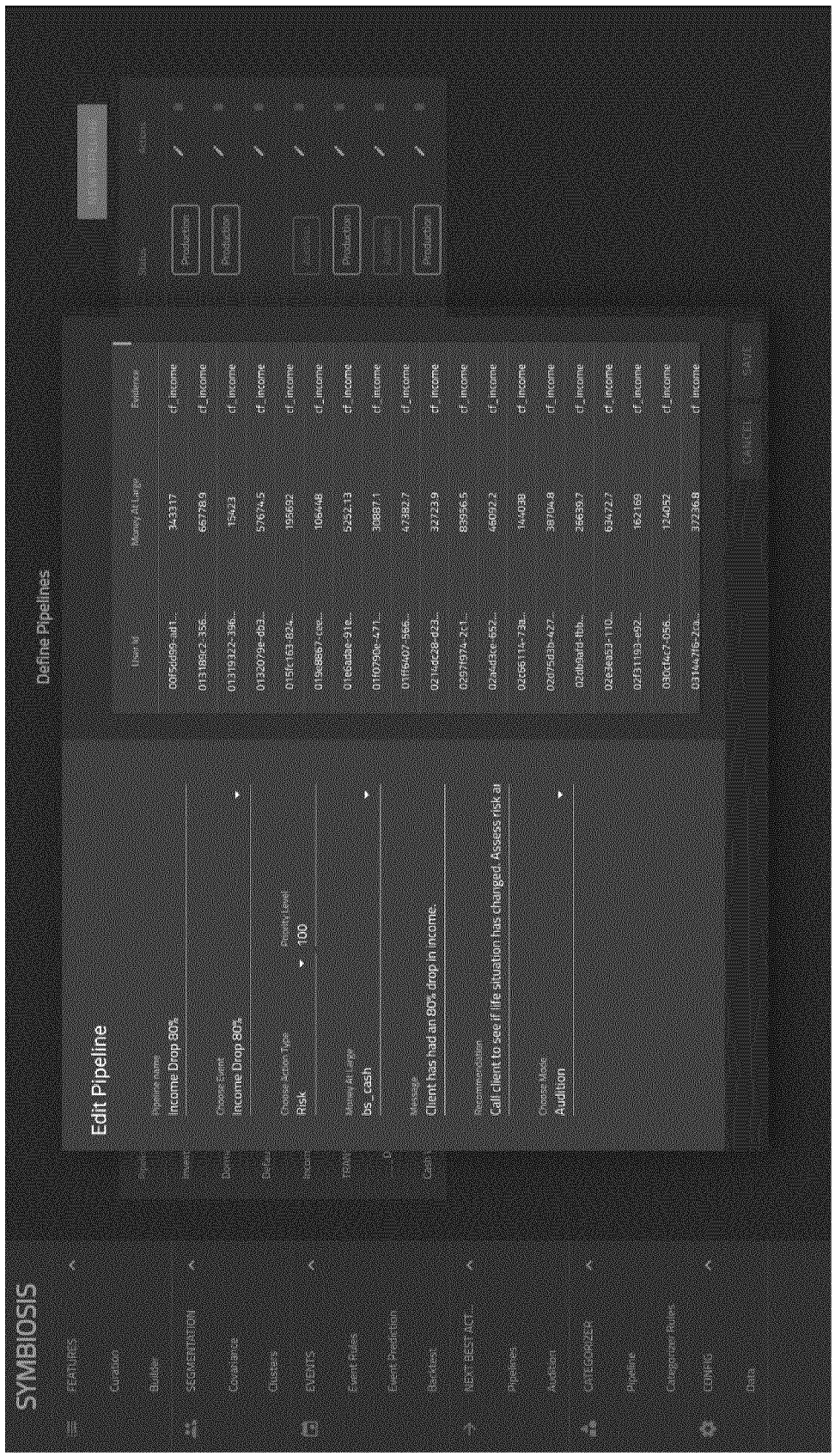
FIG. 21 shows an example screenshot of an interface dashboard.

FIG. 21 shows an example screenshot of an interface dashboard. The interface application has interface tools to edit pipelines. The pipeline can have different attributes or properties, such as pipeline name, event, action type, priority, message (for the alert notification and display), status, and actions. The interface tool can be used to edit different properties or attributes. The interface tools can set: an event, an action type, a priority level, money at large, message for the alert notification, recommendation, and so on. The tool can receive selected values for the properties. The pipeline can be used for different users that are identified in a listing along with prediction data, performance data, or near real time data. The tool can display evidence.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. For example, the programmable computers may be a server, network appliance, set-top box, embedded device, computer expansion module, personal computer, laptop, personal data assistant, cloud computing system or mobile device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may relate to various types of computing applications, such as image processing and generation applications, computing resource related applications, speech recognition applications, video processing applications, semiconductor fabrication, and so on. By way of illustrative example embodiments may be described herein in relation to image-related applications.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A system for generating and transmitting alert notifications to devices for decision making support based on holistic representations of client finances, the system comprising:
    a memory storing a machine learning model structure and state space, the state space defined by variables measuring population goals and user behaviour, the machine learning model structure being a parameterized, normalized, and rational client-centric model, the machine learning model structure having model parameters;
    a processor coupled to the memory programmed with executable instructions, the instructions configuring the processor to:
        generate event rules conditional on client profile data and prediction data using the machine learning model structure,
        detect an event using the event rules and streaming population data, and
        an alert engine being configured by machine learning to compute predictive next best action data for a client based on the detected event and model state, the next best action data having evidence supporting the detected event; wherein the processor causes the alert engine to compute the next best action data using supervised learning to predict if a past state of the state space is indicative of a future event based on indicator variables;
    generate the client profile data and the prediction data using categorized, normalized, enriched or enhanced features extracted from the streaming population data and to generate a data structure concerning a financial state of the client;
    generate visualized data of the next best action data and the financial state of the client;
    provide the visualized data to be displayed on the user interface application as an alert notification, and
    collect feedback data through a user interface application concerning the next best action data, the feedback data linked to an operational context, and adjust the machine learning model structure and constraints on the model parameters, wherein the processor implements machine learning from the feedback data to tune notification thresholds to improve relevancy of future alert messages, wherein the user interface application is configured to receive the feedback data for tuning and machine learning, wherein the next best action data is predictive and the feedback data is indicative of a relevance variable for the next best action data, the feedback data comprising data indicating the relevance or utility of the next best action data;
    wherein the processor updates parameters of the machine learning model that generates the event rules and next best action data based on the feedback data, wherein the feedback data is used to adjust a rank or priority of the next best action data; and
    wherein the processor generates a binary univariate thresholding function for features and configures the event rules using the binary univariate thresholding function, wherein the binary univariate thresholding function for features determines a level of saliency or significance in triggering the event detection and the next best action data.

2. The system of claim 1 wherein the processor uses the state space to generate the prediction data using the machine learning model structure to infer client stage of life, a behavioral profile, client financial strategy for the stage of life and the behavioral profile, tactile adjustments to the behavioral profile or financial profile to support the client financial strategy, and a notification message for a client interface indicating at least a portion of the tactile adjustments.

3. The system of claim 1 wherein the feedback data comprises data indicating activation of a detail view of the next best action data, contact of client on the next best action data, operations on client account or portfolio based on the next best action data, fund transfers, service requests.

4. The system of claim 1 wherein the processor adjusts event rules based on feedback data to adjust a hyperplane separating events from non-events.

5. The system of claim 1 wherein an event rule comprises at least one of a threshold function on one or more data features in the state space, a confidence threshold on a predicted future event in the model structure, and confidence threshold on a hidden or unobserved variable.

6. The system of claim 1 wherein the processor configures the alert engine to compute the next best action data using a hyperplane threshold on the state space to detect a set of state features.

7. The system of claim 1 wherein the processor configures the alert engine to compute the next best action data using a supervised learning system to predict if a past state of the state space is indicative of a future event based on indicator variables.

8. The system of claim 1 wherein the processor updates the event rules and next best action data based on the feedback data by adjusting a confidence threshold or hyperplane separation threshold to minimize error and maximize relevance or utility of the next best action data.

9. The system of claim 1 wherein the processor updates the event rules and next best action data based on the feedback data by adjusting a priority or rank of the next best action data in terms of advisor relevance, wherein the feedback data is indicative of the advisor relevance.

10. The system of claim 1 wherein the interface application has interface tools to adjust the machine learning model structure and constraints on parameters of the model by receiving data for features used in the model structure, wherein the interface tools configure at least one of: feature selection using a list of candidate features for the model structure and selection of hyperparameters of the model structure, an event predictor using a list of features, a dependent event indicator feature, a window size, forward period prediction length, and a supervised learning method, and a hidden state or label predictor using a list of features, a dependent event indicator feature, a window size, and a categorization method.

11. The system of claim 10 wherein the event detector is a hyperplane based event detector, wherein the interface tools configure the event detector using a list of features and a hyperplane separator.

12. The system of claim 10 wherein the interface tools display at least one of a list of machine learning model structures for selection and the model structure is a selected model structure from the list of model structures, and model performance data for the model structures along with learning parameters and model metrics.

13. The system of claim 10 wherein the interface tools select a clustering process on a list of features and configure a hyperplane detector to generate a signal for an event that a user has moved from a behavioral cluster to another behavioral cluster.

14. The system of claim 1 wherein the client profile data comprises transaction data, wherein the processor is configured to label the transaction data using categories, wherein the event rules are configured using the categories.

15. The system of claim 1 wherein the processor labels events for the model to compute the next best action data, the labels corresponding to multinomial categories, the feedback data corresponding to the multinomial categories, and updates the event rules and the next back action data using the multinomial categories.

16. The system of claim 1 wherein the processor uses supervised learning to predict an ontology and configuring the machine learning model using the ontology, wherein the ontology indicates states that are fully observable, partially observable, hidden, or expired that are useful for determining the next best action data, wherein the ontology indicates a financial persona for selecting the next best action data and wherein the processor tunes relevance of the next best action to the ontology.

17. The system of claim 1 wherein the processor configures the event rules with multivariate pattern detection for periodic data and quasiperiodic data.

18. The system of claim 1 wherein an interface dashboard receives a financial state of a user and a financial goal of the user, wherein the processor determines a discount variable for a plan to achieve the financial goal and the alert engine computes the next best action using the discount variable, the processor dispatches the next best action to the interface dashboard, wherein the discount variable is determined by: modelling past behaviour of the user and other users based at least in part on identifying transaction actions of the user, and identifying periodicity of the transaction actions, and segmenting each of the transaction actions to an archetype and the user to a persona.

19. A process for generating alert notifications at an interface dashboard for decision making support based on holistic representations of client finances, the process comprising:
    storing, at memory, a machine learning model structure and state space using on-line system data and additional machine output data generated using reinforcement learning, the state space defined in terms of variables measuring population goals and user behaviour, the machine learning model structure being a parameterized, normalized, and rational client-centric model, the machine learning model structure having model parameters;
    generating event rules conditional on client profile data and prediction data using the machine learning model structure and the categorized, normalized, enriched or enhanced extracted features to compute a financial persona for the client, wherein the financial persona defines a financial state of the client;
    detecting, an event from the client profile data using the event rules and streaming population data by a processor configured with the event rules conditional on the client profile data and the prediction data;
    computing, at the processor using supervised learning to predict if a past state of the state space is indicative of a future event based on indicator variables, predictive next best action data for a client based on the event and model state, the next best action data having evidence supporting the event;
    generating visualized data of the next best action data and the financial state of the client;
    dispatching the visualized data to the user interface application as an alert notification with the next best action data, the alert indicating the evidence;
    automatically displaying the next best action data using the user interface;
    receiving, at the interface application, feedback data for the next best action data, the feedback data linked to an operational context, and adjusting configuration of the machine learning model structure and constraints on the model parameters;
    machine learning from the feedback data to tune notification thresholds to improve relevancy of future alert messages, wherein the user interface application is configured to receive the feedback data for tuning and machine learning, wherein the next best action data is predictive and the feedback data is indicative of a relevance variable for the next best action data, the feedback data comprising data indicating the relevance or utility of the next best action data;
    updating parameters of the machine learning model that generate the event rules and the next best action data based on the feedback data using the processor; and
    automatically updating the display of the interface dashboard based on the updated event rules;
    generating a binary univariate thresholding function for features and configuring the event rules using the binary univariate thresholding function, wherein the binary univariate thresholding function for features determines a level of saliency or significance in triggering the event detection and the next best action data.

* * * * *